(12) United States Patent
Knadle, Jr. et al.

(10) Patent No.: US 7,551,140 B2
(45) Date of Patent: Jun. 23, 2009

(54) LOW RETURN LOSS RUGGED RFID ANTENNA

(75) Inventors: Richard T. Knadle, Jr., Dix Hills, NY (US); Mark Duron, East Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 526 days.

(21) Appl. No.: 11/265,143

(22) Filed: Nov. 3, 2005

(65) Prior Publication Data

US 2007/0096919 A1    May 3, 2007

(51) Int. Cl.
*H01Q 1/38* (2006.01)
*G08B 13/14* (2006.01)

(52) U.S. Cl. ............................. 343/700 MS; 340/572.7

(58) Field of Classification Search .......... 343/700 MS, 343/860; 235/492; 340/572.7, 572.8
See application file for complete search history.

(56) References Cited

U.S. PATENT DOCUMENTS

| | | | | |
|---|---|---|---|---|
| 5,001,492 | A | * | 3/1991 | Shapiro et al. ........ 343/700 MS |
| 5,995,019 | A | | 11/1999 | Chieu et al. |
| 6,107,910 | A | | 8/2000 | Nysen |
| 6,255,993 | B1 | * | 7/2001 | Greeff et al. .......... 343/700 MS |
| 6,266,015 | B1 | * | 7/2001 | Heckaman et al. .... 343/700 MS |
| 6,433,671 | B1 | | 8/2002 | Nysen |
| 6,531,957 | B1 | | 3/2003 | Nysen |
| 6,580,358 | B1 | | 6/2003 | Nysen |
| 6,950,009 | B1 | | 9/2005 | Nysen |

OTHER PUBLICATIONS

Engelbrecht, R.S. et al., "A Wide-Band Low Noise L-Band Balanced Transistor Amplifier", Proceedings of the IEEE, vol. 53, No. 3, Mar. 1965. pp. 237-247.
Kurokawa, K., "Design Theory Balanced Transistor Amplifiers", The Bell System Technical Journal, vol. 44, Oct. 1965, pp. 1675-1698.

* cited by examiner

*Primary Examiner*—Michael C Wimer

(57) ABSTRACT

Methods, systems, and apparatuses for RFID devices, such as reader antennas, are described. A reader antenna includes a quadrature hybrid coupler, a termination element, and an antenna, such as a patch antenna. The quadrature hybrid coupler has first, second, third, and fourth ports. The first port receives an input radio frequency RF signal. The second port outputs a first RF output signal. The third port outputs a second RF output signal. The second RF output signal is shifted in phase by 90 degrees relative to the first RF output signal. The fourth port is coupled to the termination element. The patch antenna has a first point coupled to the first RF output signal and a second point coupled to the second RF output signal. The patch antenna radiates a circularly polarized RF signal due to the received first and second RF output signals. The circularly polarized RF signal may be used to interrogate tags. Furthermore, the reader antenna is integrated into a ruggedized structure that provides environmental protection for the antenna, including providing shock absorption for impacts to the antenna.

38 Claims, 12 Drawing Sheets

LOW RETURN LOSS RUGGED RFID ANTENNA

BACKGROUND OF THE INVENTION

1. Field of the Invention

The invention relates to radio frequency identification (RFID) readers, and in particular, to RFID reader antennas.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored wirelessly by devices known as "readers." Readers typically have one or more antennas transmitting radio frequency signals to which tags respond. Since the reader "interrogates" RFID tags, and receives signals back from the tags in response to the interrogation, the reader is sometimes termed as "reader interrogator" or simply "interrogator".

With the maturation of RFID technology, efficient communication between tags and interrogators has become a key enabler in supply chain management, especially in manufacturing, shipping, and retail industries, as well as in building security installations, healthcare facilities, libraries, airports, warehouses etc.

The requirements for RFID readers are becoming more difficult to meet. RFID readers require an antenna that possesses proper gain, produces a desired antenna pattern, and produces a properly polarized signal. Furthermore, the antenna must provide a very low Voltage Standing Wave Ratio (VSWR), which equates to a very low RF return loss. These properties must be maintained over a considerably wide frequency bandwidth, even though the antenna may be aimed at large and highly reflective objects in the vicinity of the tags intended to be read. Reflections due to these objects can create difficulties in properly reading the tags.

Furthermore, reading of tags often takes place in an environment where the reader antenna experiences physical abuse, such as in a warehouse environment, where objects may impact the reader antenna.

Thus, what is needed are RFID reader antennas that have sufficient gain, and can produce a useful antenna pattern, with proper polarization. Furthermore, the antennas should have a low VSWR, to provide for a low RF return loss. Still further, the antennas need to be capable of operating in an environment having highly reflective objects, and should be rugged to withstand environmental abuse.

BRIEF SUMMARY OF THE INVENTION

Methods, systems, and apparatuses for RFID devices, such as readers, are described herein. For example, methods, systems, and apparatuses for improved reader antennas are described. Antennas described herein provide for desired antenna characteristics, such as gain, antenna pattern, polarization, VSWR, and return loss. Furthermore, antennas are described that are capable of operating in reflective environments and/or in environments that are abusive to antennas.

In a first aspect, a RFID reader antenna assembly includes a quadrature hybrid coupler, a termination element, and an antenna. For example, the antenna may be a patch-type of antenna. The quadrature hybrid coupler has first, second, third, and fourth ports. The first port receives an input radio frequency (RF) signal. The second port outputs a first RF output signal. The third port outputs a second RF output signal. The second RF output signal is shifted in phase by 90 degrees relative to the first RF output signal. The fourth port is coupled to the termination element. The antenna has a first point coupled to the first RF output signal and a second point coupled to the second RF output signal. The antenna radiates a circularly polarized RF signal due to the received first and second RF output signals. The circularly polarized RF signal may be used to interrogate tags.

In another aspect of the present invention, a RFID reader antenna assembly includes a back plate, a circuit board, a patch antenna, a compressible electrically insulating material, and first and second compressible contact members. The circuit board is supported by the back plate. The circuit board receives an input radio frequency (RF) signal and outputs a first RF output signal and a second RF output signal. The compressible electrically insulating material mounts the patch antenna on the back plate.

The first compressible contact member couples the first output RF signal to a first point of the patch antenna. The second compressible contact member couples the second output RF signal to a second point of the patch antenna.

The compressible electrically insulating material and first and second compressible contact members provide for shock absorption for the device, when the device is impacted.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 shows an environment where RFID readers communicate with an exemplary population of RFID tags.

FIG. 2 shown a block diagram of receiver and transmitter portions of a RFID reader.

Figure 1:
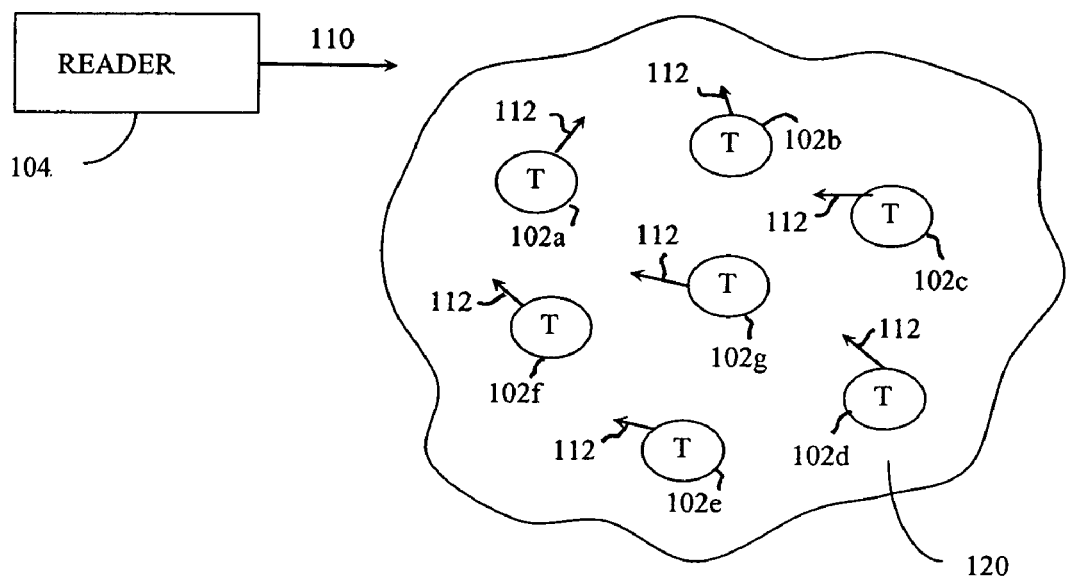

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

Methods, systems, and apparatuses for RFID devices, such as readers, are described herein. For example, methods, systems, and apparatuses for improved reader antennas are described. Antennas described herein provide for desired antenna characteristics, such as gain, antenna pattern, polarization, VSWR, and return loss. Furthermore, antennas are described that are capable of operating in reflective environments and/or in environments that are abusive to antennas.

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "down," "top," "bottom," "vertical," "horizontal," etc.) used herein are for purposes of illustration only, and that practical implementations of the structures described herein can be spatially arranged in any orientation or manner.

Example RFID System Embodiment

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. A population 120 may include any number of tags 102.

Environment 100 includes one or more readers 104. A reader 104 may be requested by an external application to address the population of tags 120. Alternatively, reader 104 may have internal logic that initiates communication, or may have a trigger mechanism that an operator of reader 104a uses to initiate communication.

As shown in FIG. 1, reader 104 transmits an interrogation signal 110 having a carrier frequency to the population of tags 120. Reader 104 operates in one or more of the frequency bands allotted for this type of RF communication. For example, frequency bands of 902-928 MHz and 2400-2483.5 MHz have been defined for certain RFID applications by the Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, such as an identification number of the responding tag 102. In the embodiments described herein, a reader may be capable of communicating with tags 102 according to any suitable communication protocol, including binary traversal protocols, slotted aloha protocols, Class 0, Class 1, EPC Gen 2, any others mentioned elsewhere herein, and future communication protocols.

Figure 2:
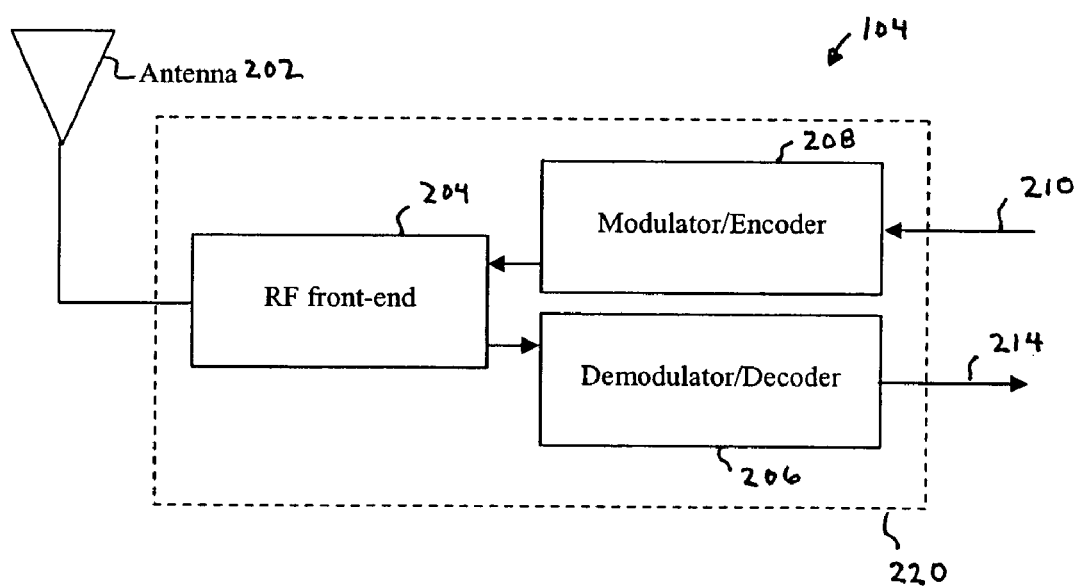

FIG. 2 shows a block diagram of a receiver and transmitter portion 220 of an example RFID reader 104. Reader 104 includes one or more antennas 202, a RF front-end 204, a demodulator/decoder 206, and a modulator/encoder 208. These components of reader 104 may include software, hardware, and/or firmware, or any combination thereof, for performing their function.

Reader 104 has at least one antenna 202 for communicating with tags 102 and/or other readers 104. RF front-end 204 may include one or more antenna matching elements, amplifiers, filters, an echo-cancellation unit, a down-converter, and/or an up-converter. RF front-end 204 receives a tag response signal through antenna 202 and down-converts (if necessary) the response signal to a frequency range amenable to further signal processing. Furthermore, RF front-end 204 receives a modulated encoded interrogation signal from modulator/encoder 208, up-converts (if necessary) the interrogation signal, and transmits the interrogation signal to antenna 202 to be radiated.

Demodulator/decoder 206 is coupled to an output of RF front-end 204, receiving a modulated tag response signal from RF front-end 204. Demodulator/decoder 206 demodulates the down-converted tag response signal. The tag response signal may include backscattered data encoded according to FM0 or Miller encoding formats. Demodulator/decoder 206 outputs a decoded data signal 214. Decoded data signal 214 may be further processed in reader 104. Additionally or alternatively, decoded data signal 214 may be transmitted to a subsequent computer system for further processing.

Modulator/encoder 208 is coupled to an input of RF front-end 204, and receives an interrogation request 210. Modulator/encoder 208 encodes interrogation request 210 into a signal format, such as one of FM0 or Miller encoding formats, modulates the encoded signal, and outputs the modulated encoded interrogation signal to RF front-end 204.

Embodiments of the present invention are described in detail below. Such embodiments may be implemented in environment 100 shown in FIG. 1, in reader 104 shown in FIG. 2, and/or in alternative environments and RFID devices. For example, embodiments of the present invention may be implemented in antenna 202 and/or in RF front-end 204 of reader 104 shown in FIG. 2.

RFID Reader Antenna Parameters and Issues

Single antennas and dual antennas for readers have been developed in attempts to improve RFID reader performance. Example antenna parameters of interest for readers include gain, antenna pattern, antenna polarization, Voltage Standing Wave Ratio (VSWR), reflection coefficient, and return loss. "VSWR" is a measure of signal "reflection," which may occur when a signal input to an antenna on a transmission line is reflected at the interface of the transmission line and antenna, due to an impedance mismatch. VSWR is the ratio of maximum to minimum amplitude in the resulting interference wave.

The "reflection coefficient" is related to VSWR, and is sometimes referred to as "S1 parameter", "ρ", or "Γ". A reflection coefficient of −1 (or an amplitude of "1" at 180 degrees) indicates a short circuit, and a reflection coefficient of 1 (at an angle of 0 degrees) indicates an open circuit. Mathematically, VSWR and the reflection coefficient are related as follows:

$$VSWR = \frac{1+|\Gamma|}{1-|\Gamma|} \qquad \text{Equation 1}$$

$$\Gamma = \left|\frac{1-VSWR}{1+VSWR}\right| \qquad \text{Equation 2}$$

Furthermore, the reflection coefficient can be expressed in dB, as the "return loss," as follows:

$$\text{return loss}=-20*\log|\Gamma| dB \qquad \text{Equation 3}$$

Essentially, "return loss" is the difference, in dB, between the amplitudes of an incident wave and a reflected wave. For example, in a reader system, the incident wave may be an RF signal produced by a reader transmitter (e.g., modulator/encoder 208 shown in FIG. 2) intended to be transmitted by an antenna of the reader. The reflected wave may be a reflection back from the antenna of the transmitter signal due to an impedance mismatch. The higher the return loss number (in −dB), the less reflection and the better the impedance match. Clearly, reflection signals are not desirable in a reader system. Any signal reflections from the antenna may be received at the reader's receiver (e.g., demodulator/decoder 206 shown in FIG. 2), and may interfere with the ability of the receiver to receive desired signals.

Until recently, low return loss requirements for reader antennas have caused dual antenna-type RFID reader systems to be used. By using separate antennas for transmitting and receiving, the problem of internal reflections is greatly reduced, because isolation between the receiving and transmitting functions is greatly improved. However, using a pair of antennas increases cost and volume as compared to single antenna systems. Furthermore, because two antennas are inherently offset, the two antennas do not look into the same volume of space. Still further, available space in portable RFID readers (among other applications) often does not allow for two antennas. Thus, single antenna solutions are desirable.

Many types of antennas exist. For most applications, an antenna VSWR specification of 2:1, or better, has been considered adequate. A 2:1 VSWR equates to a return loss of −9.54 dB, and represents a worse case transmission loss of −0.51 dB. Occasionally, for very critical applications, an antenna VSWR of 1.5:1 has been specified, which equates to a return loss of −14 dB, and a worse case transmission loss of −0.18 dB. Very few antennas exist having a manufactured specification better than this.

A new set of requirements is being introduced for RFID reader antennas, including return losses of −20 to −30 dB, which equates to a VSWR of 1.22 to 1.065, respectively, across a frequency band of interest (often 902 to 928 MHz). This new requirement is not necessarily for the purpose of maintaining transmission efficiency. The new requirement is also present to avoid saturation of RFID reader receivers that can occur when a return loss above −20 dB is present.

Because most single-antenna-type RFID readers operate in a way that is similar to a continuous wave (CW) radar with a homodyne receiver, any significant antenna reflectivity (internally-caused reflection coefficient or return loss) can cause a substantial portion of transmitter output power to be returned to the receiver. When the returned power exceeds a certain threshold, the receiver will saturate. A saturated receiver displays non-linearity effects, causing it to suffer from decreased reader sensitivity, and an increase in vulnerability to an Intermodulation Distortion (IMD) response when more than one signal is present in the environment. IMD causes false or extraneous signals within the receiver, that interfere with desired receiver performance.

Antenna types that have been used with RFID readers include the following six categories: patch antennas, cavity-backed patch antennas, inverted-F antennas, monopoles, dipoles, and Yagi antennas. When these antenna types are constructed in a full-sized version for application in an area that has a large available volume, they are usually capable of being tuned to provide acceptable gain performance, with a moderately low return loss. However, it is known that smaller antennas have a higher "Q" (i.e., ratio of bandwidth to center/resonant frequency). When antenna size is decreased, the bandwidth over which low return loss exists also decreases. Thus, when antenna types are constructed in more compact forms (dictated by lack of available volume, such as in a portable reader application), they are only capable of providing the required low return loss over a more narrow frequency region. The increasingly narrow frequency region is typically too small relative to the desirable frequency range over which RFID readers operate to comply with FCC rules (such as for a frequency-hopping unlicensed wireless service within the 902 to 928 MHz domestically used frequencies). The net result is an RFID reader that provides adequate performance over only a portion of the desired frequency region. The decreased frequency range, in turn, results in a decreased reading rate, and in unread tags, particularly when multi-path propagation is present.

A further difficulty occurs when a RFID tag resides in an environment having large, RF-reflective objects. The reflective objects can create a strong signal return to the reader (an externally-caused reflection coefficient or return loss, as opposed to the internal causes of reflections described above) as a reflection of a reader transmitted signal. The reflected signal can saturate and desensitize the reader's receiver. This can make the reader susceptible to false tag responses, and/or can mask tag responses, because of the presence of the Intermodulation Distortion (IMD) products created within the receiver when multiple signals are present in the environment (due to the external reflections).

Furthermore, both portable and fixed position RFID readers are being used in environments that can be highly physically abusive to the antenna. Example locations where an installed antenna can receive damaging impacts include on a fork lift, inside of a warehouse box crusher, or within a conveyor belt system. In such applications, even an antenna that has been carefully tuned to provide an acceptable performance will usually degrade in performance, due to the physical abuse and damage that can result from impacts to the antenna by objects being transported by, or crushed within, these types of machinery. Attempts have been made to protect antennas by placing them within a transparent radome, which can withstand impacts. This technique is only partially successful because of a necessary compromise between the physical strength and the RF transparency of radomes, as well as the disadvantage of added antenna size, including thickness, caused by the radome.

Embodiments are described in detail below for RFID reader antennas that have improved performance and ruggedness, that overcome the difficulties described above and elsewhere herein.

Example Embodiments for Improved RFID Antennas

Example embodiments for antennas are described below. In an embodiment, an antenna is configured to radiate a circularly polarized RF signal. The antenna has a very low voltage standing wave ratio (VSWR), resulting in a very low RF return loss. The antenna may be ruggedized to withstand impacts in a physically abusive environment. Although the antennas are described below in the context of an RFID environment, it will be understood by persons skilled in the relevant art(s) that the antennas may be used in environments other than RFID.

Figure 3:
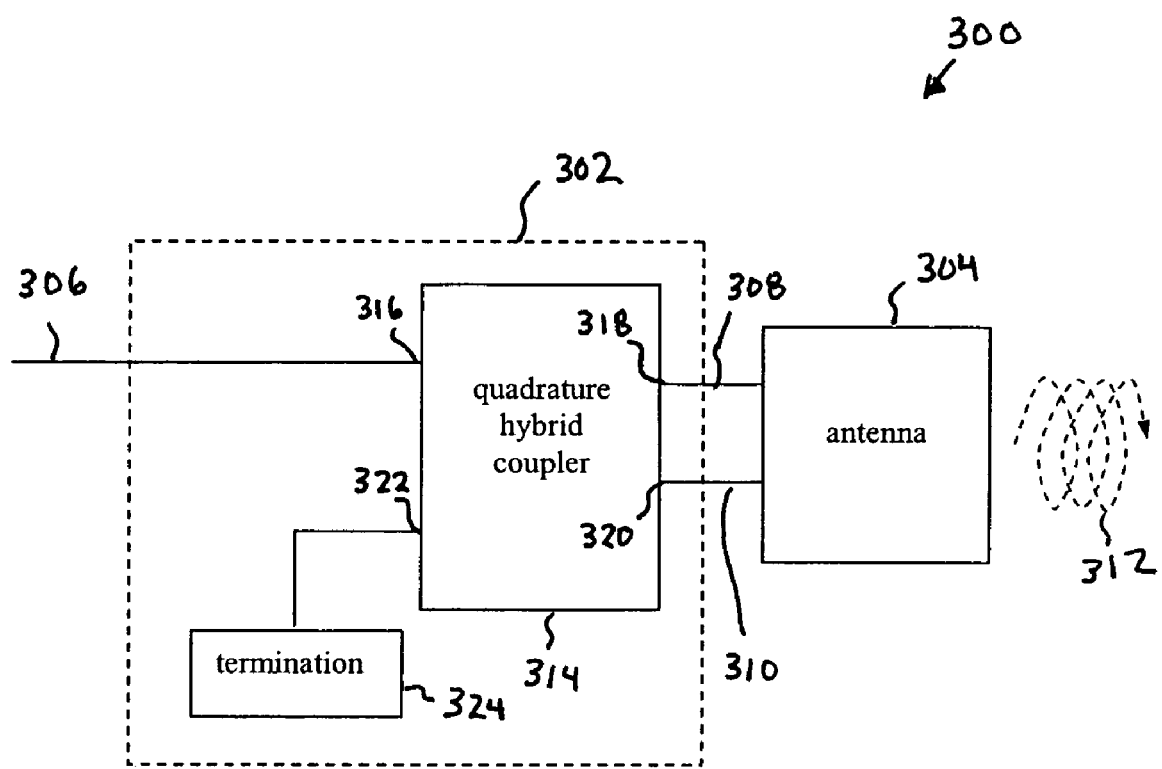
FIG. 3 shows an antenna assembly, according to an embodiment of the present invention.

FIG. 3 shows an antenna system 300. Antenna system 300 may be implemented in an RFID device, such as a reader. As shown in FIG. 3, antenna system 300 includes a circuit 302 and an antenna 304. Antenna 304 may also be referred to as a "radiator" or "radiating element." Circuit 302 receives an input RF signal 306, such as from a reader transmitter, and outputs a first RF output signal 308 and a second RF output signal 310. Antenna 304 receives the first and second RF output signals 308 and 310, and radiates a circularly polarized RF signal 312. Circularly polarized RF signal 312 can be polarized in a clockwise or counterclockwise direction, and can alternatively be elliptically polarized, if desired for the particular application.

As shown in FIG. 3, circuit 302 includes a quadrature hybrid coupler 314 and a termination element 324. Quadrature hybrid coupler 314 has first, second, third, and fourth ports 316, 318, 320, and 322. First port 316 receives input RF signal 306. Second port 318 outputs first RF output signal 308. Third port 320 outputs second RF output signal 310. Second RF output signal 310 is shifted in phase by 90 degrees (i.e., a quarter wavelength of a signal of interest) relative to first RF output signal 308 by quadrature hybrid coupler 314. Furthermore, first and second RF output signals 308 and 310 are 3 dB reduced with respect to input RF signal 306.

Termination element 324 is coupled to fourth port 322 of quadrature hybrid coupler 314. Termination element 324 can be any type of termination component, or combination of termination components, including a resistor.

Note that a receiver of the RFID reader associated with antenna system 300 receives signals from antenna 304 through input RF signal 306. In other words, for example, when antenna 304 receives a tag response signal, the tag response passes from antenna 304 through quadrature hybrid coupler 314, to the reader receiver via input RF signal 306.

Figure 4A:
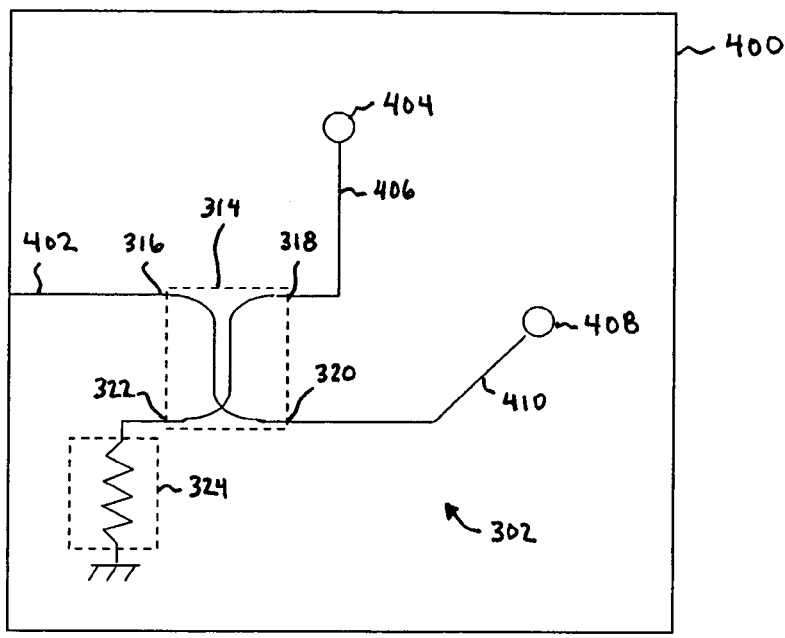
FIG. 4A shows a plan view of an example circuit board that implements the circuit of FIG. 3.

Circuit 302 may be implemented on a circuit board, such as a printed circuit board (PCB). FIG. 4A shows a plan view of an example circuit board 400 that implements circuit 302. As shown in FIG. 4A, circuit board 400 mounts quadrature hybrid coupler 314 and termination element 324. As shown in FIG. 4A, first port 316 receives input RF signal 306, which is routed to first port 316 by a transmission line 402 on circuit board 400. Transmission line 402 can be any type of transmission line, including, but not restricted to, a coaxial type, a stripline type, a microstripline type, a coplanar waveguide type transmission line.

As shown in FIG. 4A, second port 318 is coupled to a first point 404 on circuit board 400 by a transmission line 406, and third port 320 is coupled to a second point 408 on circuit board 400 by a transmission line 410. Transmission lines 406 and 410 can be any type of transmission line. First and second points 404 and 408 on circuit board 400 are coupled to respective first and second points of antenna 304, also referred to as "feed points" for antenna 304, to respectively couple first and second RF output signals 308 and 310 to antenna 304.

Quadrature hybrid coupler 314 provides a balanced impedance match between first and second points 404 and 408 on circuit board 400, to provide matched impedances to the first and second points of antenna 304 that receive first and second RF output signals 308 and 310. For example, quadrature hybrid coupler 314 may be a 3 dB directional coupler, having attributes such as being miniaturized, a high dielectric-type material (e.g., ceramic), and/or being printed circuit board mountable. Further details on example parameters for quadrature hybrid coupler 314 are described below.

Figure 4B:
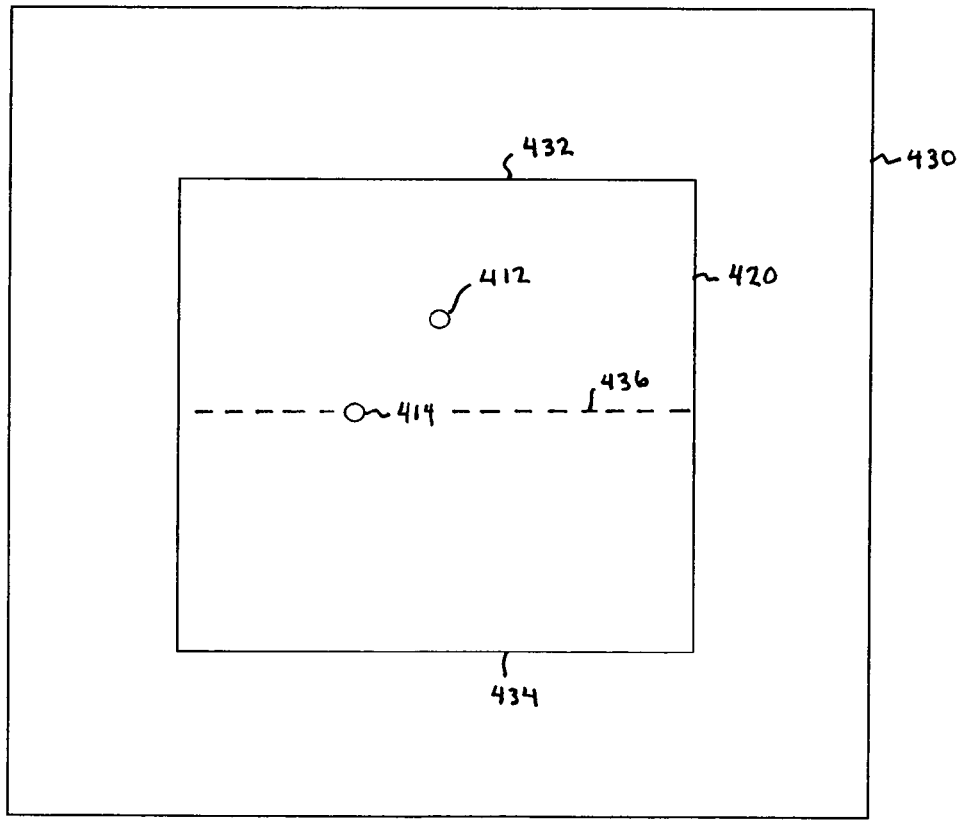
FIG. 4B shows an example antenna.

FIG. 4B shows a bottom view of an antenna 420, which is an example of antenna 304, that can be coupled to circuit board 400 of FIG. 4A. FIG. 4B further shows a ground plane element 430, positioned behind antenna 420. Antenna 420 has first and second points 412 and 414, which can be coupled to first and second points 404 and 408 of circuit board 400, when antenna 420 of FIG. 4B is flipped (e.g., horizontally) and mounted over circuit board 400. Such a mounting configuration is shown in FIGS. 8-11, which are described in further detail below. Antenna 420 is shown as a patch antenna in FIG. 4B. However, antenna 304 can be an alternative type of antenna, depending on the particular application. First and second points 412 and 414 can be referred to as "feed points" for antenna 420. First and second points 412 and 414 can also be referred to as a "horizontal polarization input" and a "vertical polarization input," respectively, for antenna 420, which combine input signals to form a circularly polarized radiated output signal.

In an example patch antenna embodiment, antenna 420 creates a strong electrical field ("E-field") along its perimeter, in a gap between antenna 420 and ground plane element 430. Antenna 420 generates a hemispherical radiation pattern that radiates outward from a side of antenna 420 this is away from ground plane 430 (i.e., radiates in a direction "out of the paper" in FIG. 4B).

Example operation of a patch antenna is described as follows for illustrative purposes, but not for purposes of limitation. In the current example, antenna 420 is a 3.63 inch×3.63 inch square patch antenna (e.g., where 3.63 inches is 0.28 of a wavelength of interest). First RF output signal 308 of FIG. 3 is fed to first point 412 of FIG. 4B (e.g., by a contact member 810 of FIG. 11, described below), causing antenna 420 to radiate a vertically polarized radiated signal. For example, at a particular instant during an RF cycle, a first horizontal perimeter edge 432 of antenna 420 is electrically positive (+), a second horizontal perimeter edge 434 is electrically negative (−), and a horizontal electrically neutral line 436 passes through second point 414 (which is electrically isolated from first RF output signal 308 applied to first point 412). As shown in FIG. 4B, ground plane element 430 is larger in area than antenna 420, having a perimeter area outside of the perimeter edge of antenna 420. This perimeter area of ground plane element 430 is non-resonant, and remains RF neutral. Thus, edge 432 of antenna 420 operates as a slot antenna, with an E-field vector pointing downward along edge 432, because the (+) field of antenna 420 is (+) with respect to the area of ground plane element 430 above it. Correspondingly, edge 434 of antenna 420 is (−) compared to the area of the neutral ground plane element 430 below it (which appears (+) by comparison).

Thus, again, the E-field vector points downward along edge 434. A net result is that the upper "slot" (edge 432) and the lower "slot" (edge 434) are co-phase E-field radiators. Thus, antenna 420 functions like a pair of slot antennas that constitute an interferometer, with only 3.63 inches of spacing (0.28 wavelength) between the slot antennas.

One half of an RF cycle later, the (+) and (−) voltages (and vectors) of edges 432 and 434 are reversed, and horizontal line 436 through second point 414 stays neutral. By an analogous process, second RF output signal 310 is fed to second point 414 and creates a horizontal polarized radiated signal. The horizontal and vertical radiated signals are independent from each other, but because first and second points 412 and 414 are fed with equal amplitude signals having a quadrature phase relationship, a circular polarized (CP) signal is radiated by antenna 420.

Figure 5:
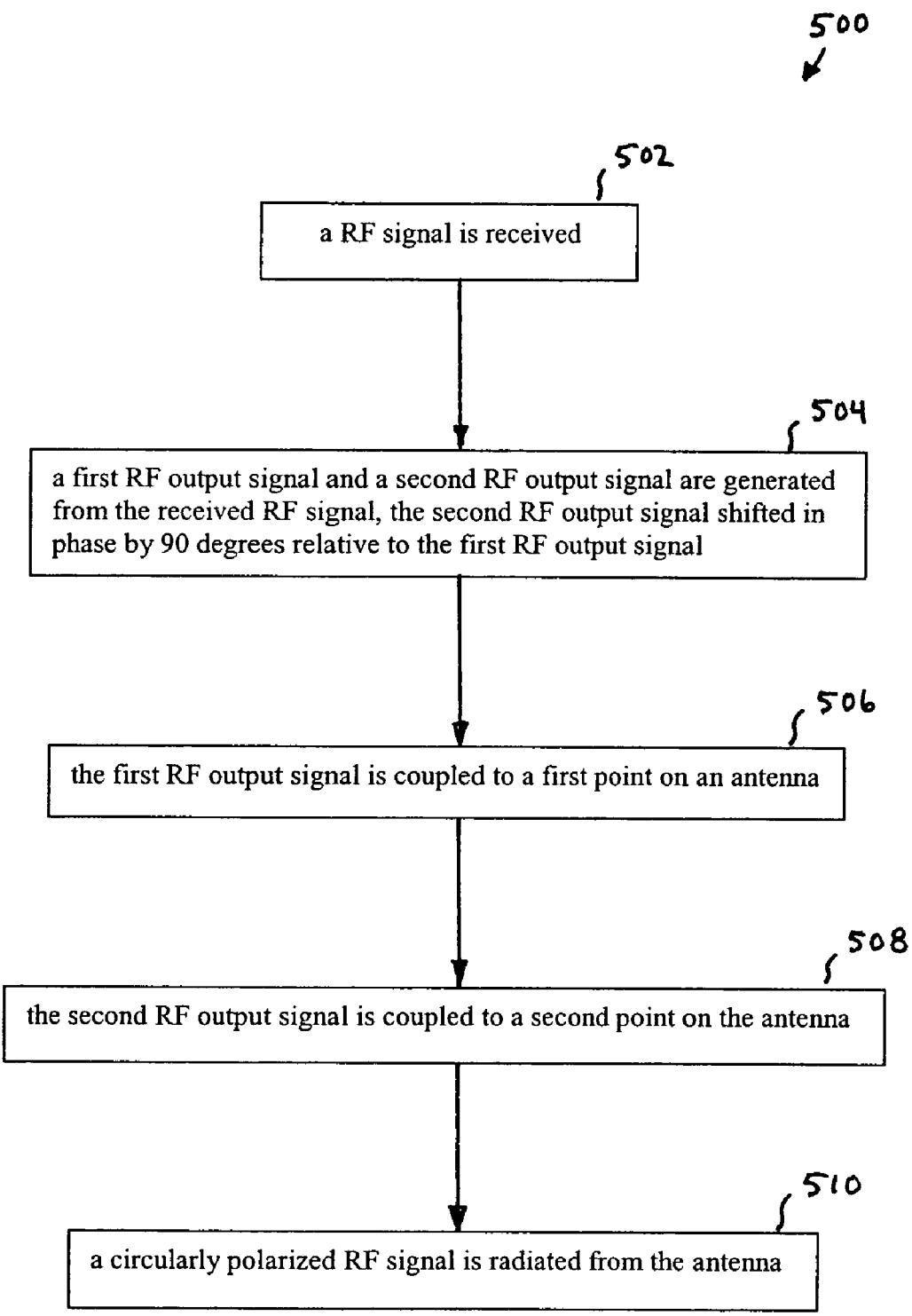
FIG. 5 shows a flowchart providing example steps for transmitting an RF signal, according to an example embodiment of the present invention.

FIG. 5 shows a flowchart 500 providing example steps for transmitting an RF signal. Other structural and operational embodiments will be apparent to persons skilled in the relevant art(s) based on the following discussion. The steps shown in FIG. 5 do not necessarily have to occur in the order shown. The steps of FIG. 5 are described in detail below.

Flowchart 500 begins with step 502. In step 502, a RF signal is received. For example, as shown in FIG. 4A, input RF signal 306 is received on transmission line 402. Input RF signal 306 can be received from a reader transmitter associated with antenna system 300.

In step 504, a first RF output signal and a second RF output signal are generated from the received RF signal, where the second RF output signal is shifted in phase by 90 degrees relative to the first RF output signal. For example, as shown in FIG. 4A, input RF signal 306 is received at first port 316 of quadrature hybrid coupler 314. Quadrature hybrid coupler 314 generates first and second RF output signals 308 and 310, which are 90 degrees apart in phase.

In step 506, the first RF output signal is coupled to a first point on an antenna. For example, as shown in FIGS. 4A and 4B, first RF output signal 308 is coupled to first point 412 of antenna 420 (via transmission line 406 and first point 404 of circuit board 400).

In step 508, the second RF output signal is coupled to a second point on the antenna. For example, as shown in FIGS. 4A and 4B, second RF output signal 310 is coupled to second point 414 of antenna 420 (via transmission line 410 and second point 408 of circuit board 400).

In step 510, a circularly polarized RF signal is radiated from the antenna. For example, as shown in FIG. 3, circularly polarized RF signal 312 is radiated by antenna 304.

Example Advantages of the Antenna Embodiments

The operation of circuit 302 of FIGS. 3 and 4A provides benefits, similar to operation of a balanced amplifier, which is sometimes referred to as a "Kurokawa" amplifier. The "balanced amplifier" concept is based on the reality that providing a broadband impedance match to an amplifier may be difficult; however, providing a pair of amplifiers that are substantially equal in their impedance mismatch characteristics is relatively easy. When a pair of amplifiers that possess an equal impedance mismatch are fed from a well-balanced quadrature hybrid coupler, the net result is a broadband impedance matched amplifier assembly that possesses a very small resultant return loss. This is because any reflected energy is equally reflected from both of the amplifiers. The reflected energy passes back through the quadrature hybrid. The quadrature hybrid introduces an additional 90-degree differential phase shift to some of the reflected energy. Because of this, the signals reflected back through the quadrature hybrid from the two amplifiers have a total of 180 degrees of differential phase shift at the input port of the quadrature hybrid, and are thus cancelled. The reflected signals have zero degrees of differential phase shift at the terminated port of the quadrature hybrid, but are absorbed by the termination. Thus the majority of the energy reflected from the two matched amplifiers is absorbed. The resultant amplifier system has an S11 parameter value that is half of the vector difference between the S11 parameters of the two individual amplifiers.

For further information regarding balanced amplifiers, and example quadrature hybrid couplers, refer to R. S. Engelbrecht and K. Kurokawa, "A Wideband Low Noise L-Band Balanced Transistor Amplifier," Proc. IEEE, vol. 53, no. 3, pp. 237-247, March 1965, and K. Kurokawa, "Design Theory of Balanced Transistor Amplifiers," Bell System Tech. J., vol. 44, pp. 1675-1698, October 1965, which are both herein incorporated by reference in their entireties.

Instead of the two amplifiers used in the balanced amplifier approach, the present embodiment uses two orthogonal antenna feed points, first point 412 and second point 414 of antenna 420 (one of which is considered horizontally polarized and the other is considered vertically polarized). The "balanced antenna feed point" approach of the present invention reduces reflections in a similar manner to the balanced amplifier approach.

Figure 6:
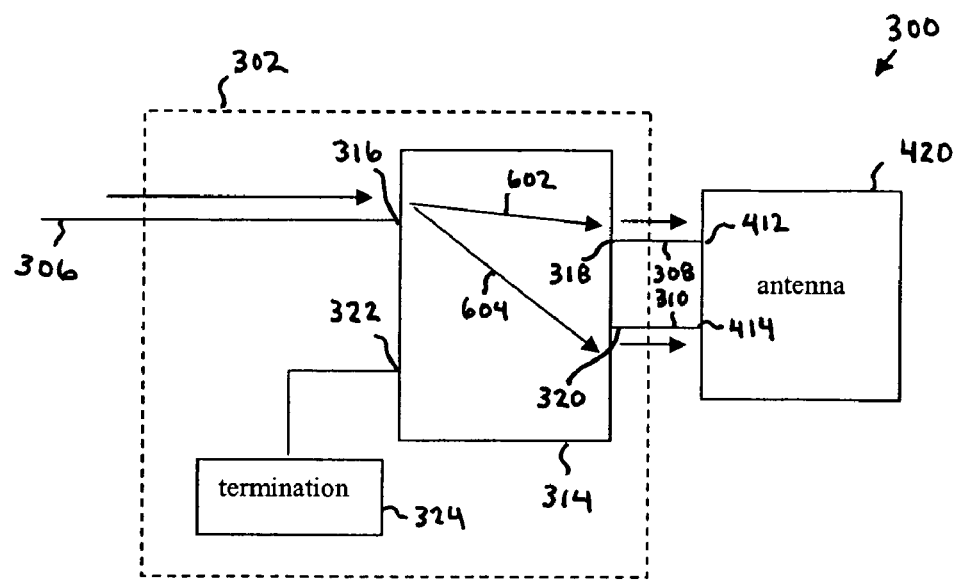
FIGS. 6 and 7 show handling of a reflected signal by an antenna assembly.
Figure 7:
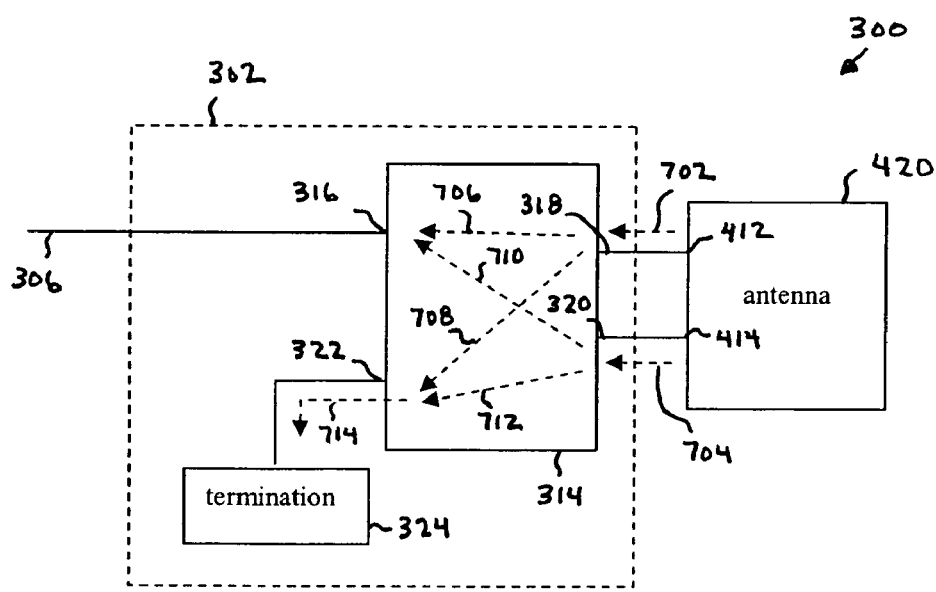

FIGS. 6 and 7 illustrate balanced handling of internally reflected signals by antenna system 300 of FIG. 3 (with antenna 420 shown coupled to quadrature hybrid coupler 314). As shown in FIG. 6, input RF signal 306 is split in quadrature hybrid coupler 314 (represented by paths 602 and 604) into first and second RF output signals 308 and 310. First and second RF output signals 308 and 310 have substantially the same amplitude, and second RF output signal 310 is delayed by 90 degrees relative to first RF output signal 308. As indicated in FIG. 6, first and second RF output signals 308 and 310 reach points 412 and 414 (i.e., "feed points") of antenna 420.

FIG. 7 shows first and second signals 702 and 704 that are reflected from first and second points 412 and 414 of antenna 420. Because first and second signals 702 and 704 are reflections of first and second RF output signals 308 and 310, respectively, second signal 704 is already delayed 90 degrees relative to first signal 702. As shown in FIG. 7, signal 702 reflected from first point 412 enters second port 318 of quadrature hybrid coupler 314 and is split into first and second reflection signals 706 and 708. Second reflection signal 708 is shifted in phase by 90 degrees relative to first reflection signal 706 by quadrature hybrid coupler 314. Signal 704 reflected from second point 414 of antenna 420 enters third port 320 of quadrature hybrid coupler 314 and is split into third and fourth reflection signals 710 and 712. Third reflection signal 710 is shifted in phase by 90 degrees relative to fourth reflection signal 712 by quadrature hybrid coupler 314, and thus third reflection signal 710 is delayed a total of 180 degrees relative to first reflection signal 706. First and third reflection signals 706 and 710 are both directed to first port 316 of quadrature hybrid coupler 314. First and third reflection signals 706 and 710 cancel each other at first port 316, because they are 180 degrees out of phase. Second and fourth reflection signals 708 and 712 are both directed to fourth port 322 of quadrature hybrid coupler 314. Second and fourth reflections 708 and 712 are in phase and are both received by termination element 314 coupled to fourth port 322 (as represented by path 714), and are absorbed. Thus, due to the configuration of circuit 302, reflections are substantially removed (i.e., canceled, terminated) in antenna system 300.

The application of the balanced amplifier technique to a dual-polarized antenna, as described herein, provides several benefits, including lowering the natural return loss of each of the dual antenna elements (e.g., first and second points 412 and 414 of antenna 420) by at least one to two orders of magnitude, enabling return loss to remain low even though the antenna may be aimed into a highly RF-reflective environment external to the antenna (even objects within one inch of the antenna), and enabling return loss to not be degraded even though the antenna has been decreased in size, even well beyond the point where antenna Q has increased substantially.

Return loss is kept extremely low in various ways. For example, as described above with respect to FIGS. 6 and 7, careful impedance matching (balancing) between the two antenna feed points (412 and 414) cancels internal reflections from the two antennas. Additionally, most RF-reflecting objects located in front of antenna 420 will reverse the sense of the circular polarization of circularly polarized RF signal 312 radiated by antenna 420. For example, if circularly polarized RF signal 312 is clockwise polarized, its reflected signal will be received by antenna 420 as a counter-clockwise polarized signal. Thus, the reversed, reflected energy from the environment will also be routed to, and terminated at fourth port 422 of quadrature hybrid coupler 314 by termination element 324. Still further, as described in more detail below, rugged and stabilized antenna structures of the present invention allow the carefully-matched impedance of the antenna pair to be maintained despite physical abuse that may be inflicted upon antenna 420 (even without a protective radome).

With regard to antenna "Q", which is a ratio of bandwidth to resonant frequency, patch-type antennas display a characteristic where a decrease in the spacing between antenna and ground plane causes an increase in antenna Q. This tends to cause a decrease in useable gain bandwidth, and in usable return loss bandwidth. For example see Jasik and Johnson, "Antenna Engineering Handbook" McGraw-Hill, 1993, page 7-7, for a related discussion. There have been conventional attempts to solve this problem by using high dielectric materials to increase an "electrical height" of the antenna, thus negating this factor. However, in reality, for a high performance patch antenna, the height and width of an external air gap in which the antenna radiates is also an important factor. Thus, the absolute thickness of the air gap between the antenna and ground plane (e.g., back plate, as described below), as well as the length of RF-emitting edges of the antenna, determine the antenna's Q and usable bandwidth.

In antennas of the present invention, the balanced approach to feeding antenna 420 enables a substantial lowering of the "electrical height" of antenna 420. Although the lowering has considerably raised the antenna Q, and thus lowered the gain bandwidth, careful impedance matching between feed points 412 and 414 enables there to be essentially no impact on the return loss bandwidth. For an RFID reader, this is a beneficial trade-off, because return loss is an important characteristic in enabling an RFID reader to perform well. Any gain decrease that exists at the bandwidth edges of antenna 420 has a secondary effect on a tag-reading range. This is because the main factor determining reading range is the forward-link "charging RF signal strength" that a passive RFID tag experiences from the main carrier wave frequency transmitted by a reader. This is a function of the reader's antenna gain, at the central frequency, and the tag-to-reader distance (by inverse square law). Thus, this charging strength is not substantially affected by gain changes at the bandwidth edges of the antenna.

For example, a 1 dB decrease in antenna gain at the antenna bandwidth edges (due to internal VSWR) only causes tag read range to decrease to 89%. The 1 dB decrease in the antenna gain is caused by the antenna feed points each displaying a VSWR of 2.66 (a return loss of −6.87 dB) at the bandwidth edges. However, due to the impedance balancing of the present invention, the first port 316 of quadrature hybrid coupler displays a VSWR of better than 1.10 (a return loss of −26 dB), which exposes a reader receiver to less than a +4.0 dBm (0.0025 watt) reflection signal from a one watt (+30 dBm) reader transmitter. Without the present balanced feed point approach, the antenna impedance displays a VSWR of 2.66 (a return loss of −6.87 dB), and the RFID reader would be saturated with a reflected power of +23.1 dBm (0.206 watts). Thus, in this example, the present balanced impedance approach causes an improvement of 19.1 dB (23.1 dBm vs 4 dBm) in the reflected power returned to the reader receiver (which is nearly 2 orders of magnitude).

Patch antennas can be formed on printed circuit boards (PCBs). Such patch antennas are often called "microstrip" antennas. Techniques for achieving circular polarization with a patch antenna include the following:

(1) Corner feeding a slightly non-symmetric patch antenna (with or without a trim tab);

(2) Using a 45 degree offset feeding system on two sides of the patch antenna;

(3) Feeding two sides of the patch antenna with a "branch line" coupler; or (4) Feeding two sides of the patch antenna with a quadrature hybrid coupler.

Technique (4) is conventionally considered expensive due to the cost and size of conventional quadrature hybrid couplers. See Jasik & Johnson (referenced above), chapter 7. Where quadrature hybrid couplers previously have been used, the relationship to a balanced amplifier approach was not recognized. For example, the extremely low return loss capability (over a broad bandwidth) was not recognized, nor was the combination of a well-balanced quadrature hybrid coupler with a highly symmetric patch antenna.

A "branch line" type quadrature hybrid coupler (of Technique (3)) is less desirable for a low return loss type of circularly polarized antenna. Previously, branch line type 3 dB hybrid couplers were more popular, because they were easier (and cheaper) to fabricate within a monolithic PCB. However, branch line hybrid couplers are typically not well balanced, and only maintain that balance over a much narrower bandwidth. An example of a multistage version of a branch line 3 dB hybrid coupler device is described in H. Howe, "Stripline Circuit Design Techniques," Artech, 1974. The multistage branch line hybrid coupler possesses more bandwidth than a single stage type. However, it cannot equal the bandwidth, or balance capability, of a 3 dB directional hybrid coupler (as in embodiments of the present invention), unless a large number of multi-stages are cascaded. However, this approach is undesirable because it uses a large amount of PCB area, is not in a commercially available component, and requires a large amount of computer modeling to achieve the desired performance requirements.

Newly available, 3 dB directional quadrature hybrid couplers, having attributes such as being relatively inexpensive, high dielectric type, miniaturized, ceramic, and printed circuit board-mountable make the present type of balanced feed point antenna feasible, allowing a reasonable-sized PCB to be implemented within the antenna structure. Thus, as described further below, the antenna itself can act as a physical protective device to protect the circuit board (e.g., circuit board 400). Previously, quadrature hybrid couplers were quite large in size, relatively expensive, and required complex assembly processes for realization.

Example techniques for reducing the return loss of an RFID reader antenna include:

(1) Adding attenuation (padding);

(2) Using a circulator or unilateralizing amplifier;

(3) Using a quadrature hybrid with matched pairs of antennas; or (4) Using a return signal canceller circuit (an RF canceller).

Technique (1) decreases a RFID reader receiver sensitivity by an amount that is twice the dB rating of the pad.

Technique (2) causes receiver desensitization because it directly absorbs a modulated tag response signal due to the same antenna being used for transmission and reception (assuming a single-antenna reader).

Technique (3) is the best solution of the four. Technique (3) is passive, solves the reflection problem across a significant bandwidth (as much as an octave, or greater), and has the further advantage of circular polarization selectivity. In other words, the direction of circular polarization may be reversed, by switching the input signals to first port 316 and fourth port 322 of quadrature hybrid coupler 314. Most reflecting objects that are placed in front of antenna 420 will reflect a circular polarized signal in the direction opposite the signal radiated by antenna 420. Thus, a clockwise radiated signal will be reflected as a counter-clockwise signal. If the opposite direction signal is received by antenna 420, it will be absorbed by termination element 324 at forth port 322 of quadrature hybrid coupler 314. Because a tag has a linear polarized antenna, however, tag responses will be linearly polarized. Thus, a received linear polarized tag signal will only suffer the 3 dB loss of quadrature hybrid coupler 314 as it passes through to the receiver portion of the reader.

Technique (4) has good antenna return loss performance, but has relatively high circuit cost, volume, and high consumption of power. For example, because a RF canceller is typically connected to a receiver transmission line by way of a 10 or 15 dB coupler, the RF canceller must produce an amount of power that is 10 to 15 dB stronger than the return loss power that is being cancelled. This may require as much as 1 watt of RF power to be generated by the RF canceller circuit.

Example Antenna Structures

FIGS. 8-14 show views of example antenna structures and systems, according to embodiments of the present invention. In embodiments, the antenna structures of FIGS. 8-14 are used to implement antenna system 300 described above. The embodiments of FIGS. 8-14 are provided for illustrative purposes, and are not intended to limit the present invention. Alternative embodiments, including modifications, combinations, etc., will be known to persons skilled in the relevant art(s) from the teachings herein. These alternative embodiments are within the scope and spirit of the present invention.

Figure 8:
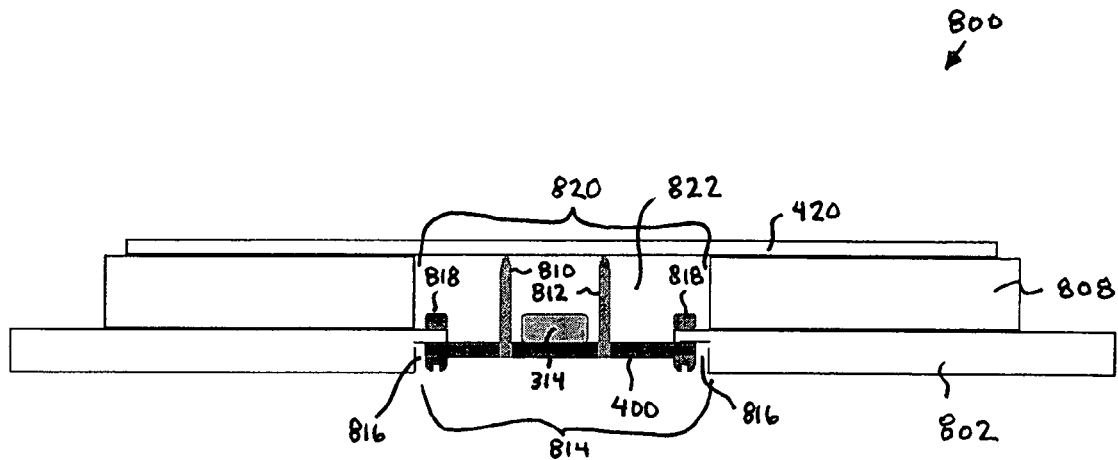
FIGS. 8-14 show views of example antenna structures, according to embodiments of the present invention.

FIG. 8 shows a cross-sectional view of an antenna assembly 800. As shown in FIG. 8, antenna assembly 800 includes a back plate 802, circuit board 400, antenna 420, a compressible electrically insulating material 808, and first and second compressible contact members 810 and 812.

Back plate 802 is a planar, rectangular shaped plate that provides mechanical support and protection for antenna assembly 800. Back plate 802 is typically made from a rigid material, such as a metal, including aluminum, steel, or other metal or alloy/combination of metals. Back plate 802 can have shapes other than shown in FIG. 8, including non-planar, rounded, etc. Back plate 802 is often coupled to ground, to form a larger ground plane for antenna assembly 800, but grounding of back plate 802 is not required.

Figure 9:
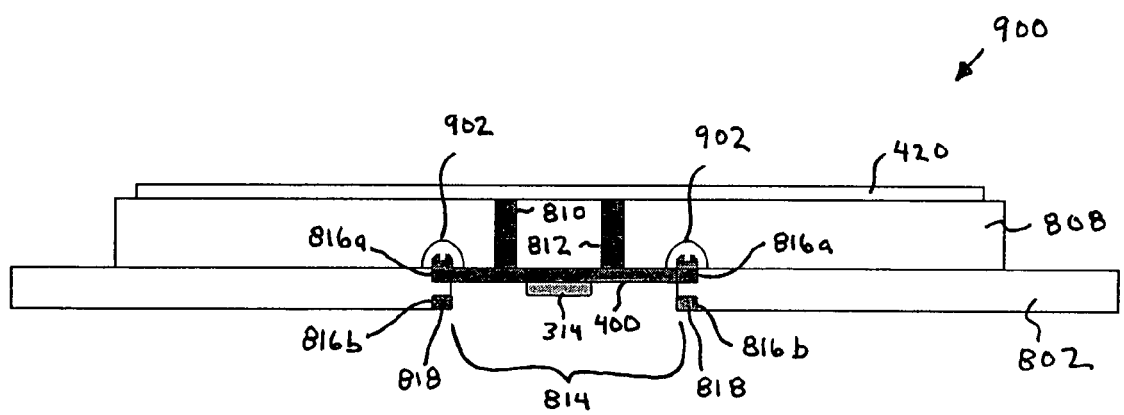
Figure 10:
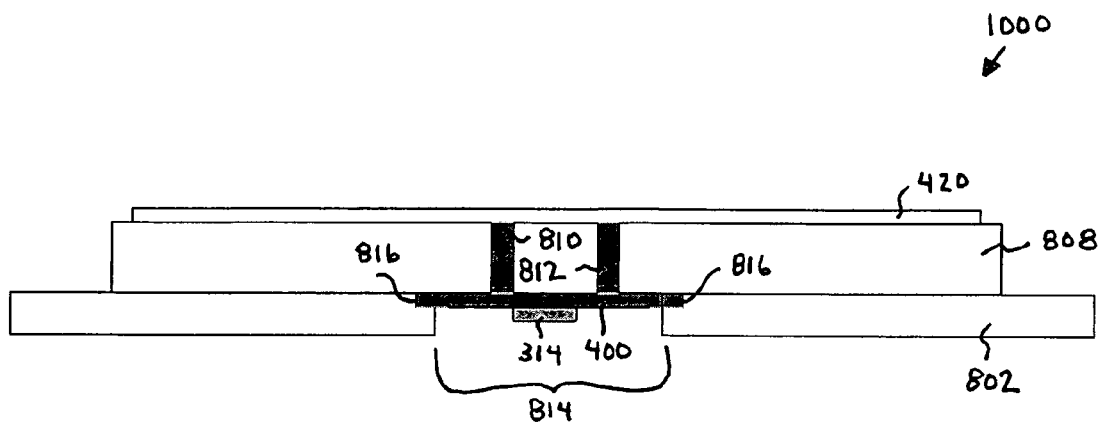

Circuit board 400 is supported by back plate 802. In the embodiment of FIG. 8, back plate 802 has a centrally-located opening 814. Circuit board 400 may be mounted in centrally-located opening 814. For example, a recessed area 816 or ledge may be formed in back plate 802 in a perimeter edge surrounding opening 814. The recessed area 816 may be formed in a bottom surface of back plate 802 (as shown in FIG. 8), may be formed in a top surface of back plate 802 (as shown in FIG. 10), or may be formed in both the top and bottom surface of back plate 802 (as shown in FIG. 9 as recessed areas 816a and 816b). Circuit board 400 may be attached in recessed area 816 by one or more bolts, screws, or other attachment elements, and/or by an adhesive material. For example, FIG. 8 shows circuit board 400 mounted to recessed area 816 in a bottom surface of back plate 802 by a plurality of screws 818.

Antenna 420 is a planar, rectangular shaped plate that operates to radiate circularly polarized RF signal 312, similarly to antenna 304 of FIG. 3. Antenna 420 is typically made from an electrically conductive, rigid material, such as a metal, including aluminum, steel (including stainless steel), or other metal or alloy/combination of metals. Antenna 420 can have shapes other than shown in FIG. 8, including non-planar, rounded, etc. For example, antenna 420 may be a 0.100 inch thick piece of gold-plated stainless steel. Antenna 420 can have any size, depending on the particular application. For example antenna 420 may be a 3.63 inch×3.63 inch square.

First compressible contact member 810 couples first output RF signal 308 to first point 412 of antenna 420. Second compressible contact member 812 couples second output RF signal 310 to second point 414 of antenna 420. For example, first and second contact members 810 and 812 couple contact points 404 and 408 of circuit board 400, shown in FIG. 4A, with contact points 412 and 414 ("feed points") of antenna 420, shown in FIG. 4B. First and second compressible contact members 810 and 812 can be any type of compressible electrical contacts, including "pogo"-type pins (as shown in FIG. 8) (e.g., spring loaded) or conductive elastomer contacts (as shown in FIGS. 9 and 10). The bottom surface (and optionally the top surface) of antenna 420 may be passivated with gold, or other electrically conductive metal, to improve an electrical contact with first and second compressible contact members 810 and 812. Furthermore, contact members 810 and 812 may be plated with gold, or other electrically conductive material, to improve the electrical contact.

Compressible electrically insulating material 808 mounts antenna 420 on back plate 802. Compressible electrically insulating material 808 can be any type of compressible dielectric material, including a silicone dielectric material such as a high durometer silicone rubber elastomer (e.g., having a 60 durometer value). A 60 durometer silicone rubber simultaneously supplies strong physical support, impact energy absorption, and a low dielectric loss tangent supporting antenna 420, and thus does not dissipate RF power applied to antenna 420.

Compressible electrically insulating material 808 and first and second compressible contact members 810 and 812 provide for shock absorption during an impact on antenna 420 when antenna assembly 800 is used in an operational environment. Example environmental stresses that may be received by antenna assembly 800 are described more fully further below. Thus, insulating material 808 serves multiple purposes, including supporting and spacing antenna 420 from back plate 802, absorbing the energy of an impact to antenna 420, and weather proofing circuit board 400 mounted between antenna 420 and back plate 802.

First and second compressible contact members 810 and 812 provide mechanical compliance needed during physical impacts to antenna 420, while not significantly deviating in electrical conductivity during their compression. In particular, during compression, first and second compressible contact members 810 and 812 each experience a minor, but matched change in inductance, which therefore does not significantly impact performance.

As shown in FIG. 8, compressible electrically insulating material 808 may have a centrally located opening 820 to form an open space 822 between circuit board 400 and antenna 420. Space 822 is ideally kept free of moisture and other contaminants, to avoid compromising the contact of contact members 810 and 812 with antenna 420, and to avoid damage to circuit board 400. Alternatively, compressible electrically insulating material 808 may cover circuit board 400 to substantially fill space 822 between circuit board 400 and antenna 420 (such as shown in FIGS. 9 and 10).

Figure 11:
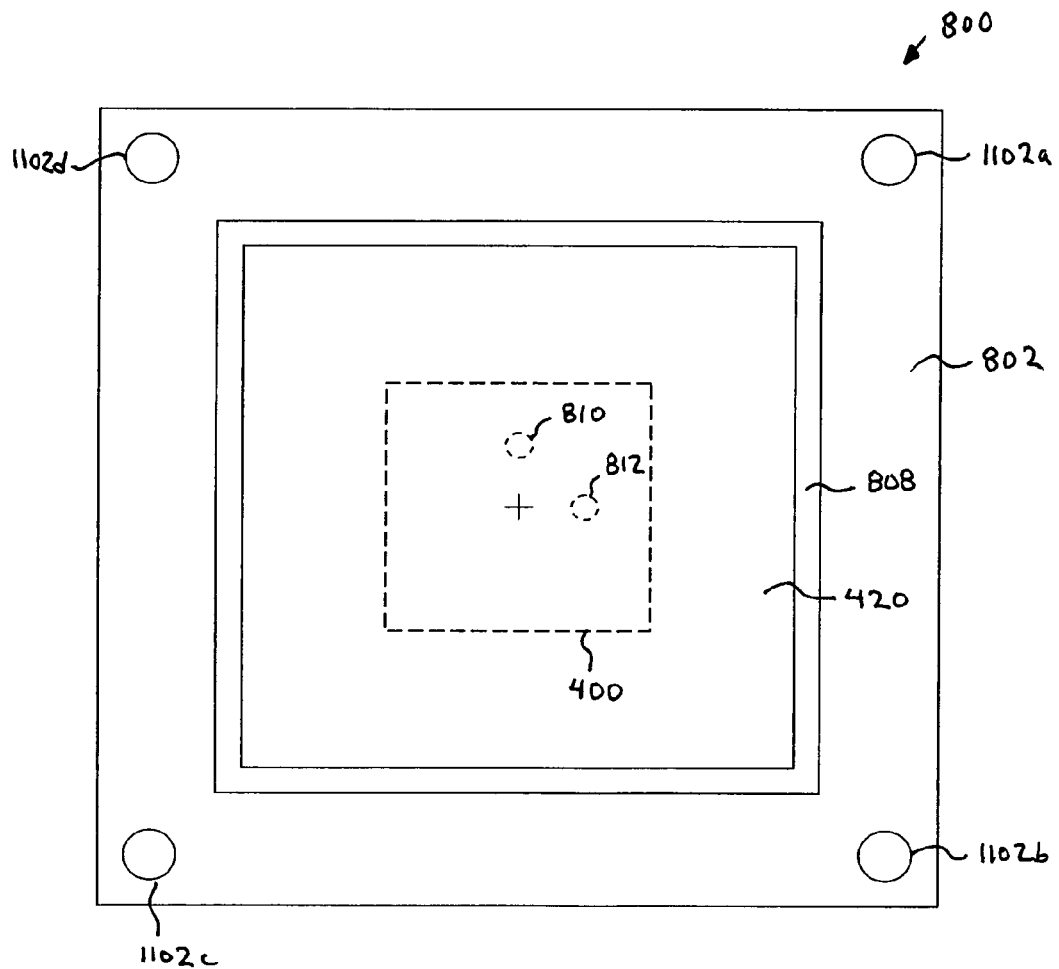

FIG. 11 shows a top view of antenna assembly 800 of FIG. 8. FIG. 11 shows antenna 420 supported on back plate 802 by compressible electrically insulating material 808. Furthermore, FIG. 11 shows an outline of the positions of circuit board 400 and compressible contact members 810 and 812, which are actually hidden below antenna 420. FIG. 11 also shows openings 1102a-1102d, located in corners of back plate 802, which may be used to mount antenna assembly 800 to a structure (e.g., using bolts, screws, nails, or other attachment elements). Any number or configuration of openings 1102, or other mounting mechanism, may be present for mounting antenna assembly 800, if desired for a particular application.

In one example, antenna 420 of FIG. 8 is a 3.75 inch×3.75 inch square patch antenna, that is a 0.1 inches thick steel plate. Insulating material 808 is a 4 inch×4 inch square, that is 0.2 inches thick. Back plate 802 is a 6 inch×6 inch square aluminum plate that is 0.25 inches thick. Thus, antenna assembly 800 of FIG. 8 has an approximate thickness of 0.55 inches. All components are contained within the low profile, protected structure of antenna assembly 800.

FIG. 9 shows a cross-sectional view of an antenna assembly 900, which is generally similar to antenna assembly 800. As described above, back plate 802 in antenna assembly 900 has recessed areas 816a and 816b formed respectively in both the top and bottom surfaces of back plate 802, around opening 814. Furthermore, compressible electrically insulating material 808 covers circuit board 400 to substantially fill the space between circuit board 400 and antenna 420. Air gaps 902 remain around the heads of screws 818, so that screws 818 may be easily accessed if compressible electrically insulating material 808 is peeled from back plate 802 (e.g., during maintenance of antenna assembly 900). As shown in FIG. 9, first and second compressible contact members 810 and 812 are conductive elastomer-type contacts. Conductive elastomer-type contacts may have less susceptibility to mechanical damage during compression of antenna assembly 900, and to environmental conditions, as compared to pogo-type contacts (e.g., degradation of the pogo contact-to-antenna interface, causing noisy contacts). A conductive adhesive may be used at the top and bottom locations of first and second compressible contact members 810 and 812 to provide reliable electrical contact with circuit board 400 and antenna 420.

Furthermore, circuit board 400 of FIG. 9 is inverted relative to circuit board 400 shown in FIG. 8 (e.g., quadrature hybrid coupler 314 is mounted to a bottom surface of circuit board 400 in FIG. 9). Furthermore, a bottom surface of circuit board 400 in FIG. 9 is coated with a weather sealant, to environmentally protect circuit board 400 and related components.

FIG. 10 shows a cross-sectional view of an antenna assembly 1000, which is generally similar to antenna assembly 900 of FIG. 9. As described above, back plate 802 in antenna assembly 1000 has a recessed area 816 formed in the top surface of back plate 802, around the perimeter of opening 814. Circuit board 400 is mounted to back plate 802 by positioning the edges of circuit board 400 in recessed area 816, and using an adhesive around the perimeter/bottom edge of circuit board 400 to hold circuit board 400 in recessed area 816. Furthermore, the adhesive may be conductive, to provide an improved electrical contact between circuit board 400 and back plate 802 (e.g., when grounded), if desired.

Furthermore, compressible electrically insulating material 808 covers circuit board 400 to substantially fill the space between circuit board 400 and antenna 420. As screws 818 are not necessary in antenna assembly 1000, air gaps 902 shown in FIG. 9 are not present. Thus, no spaces or voids are present in compressible electrically insulating material 808 in antenna assembly 1000. Thus, water and contaminants are displaced by compressible electrically insulating material 808, which reduces the risk of failure of antenna assembly 1000 due to the water or other contaminants reaching circuit board 400, or other components internal to antenna assembly 1000.

Antenna assembly 1000 has numerous benefits. For example, antenna assembly 1000 requires fewer components than antenna assemblies 800 and 900, thereby reducing costs. Furthermore, assembly of antenna assembly 1000 is simplified, as it can be formed as a laminated assembly. Antenna assembly 1000 is fully environmentally passivated.

Figure 12:
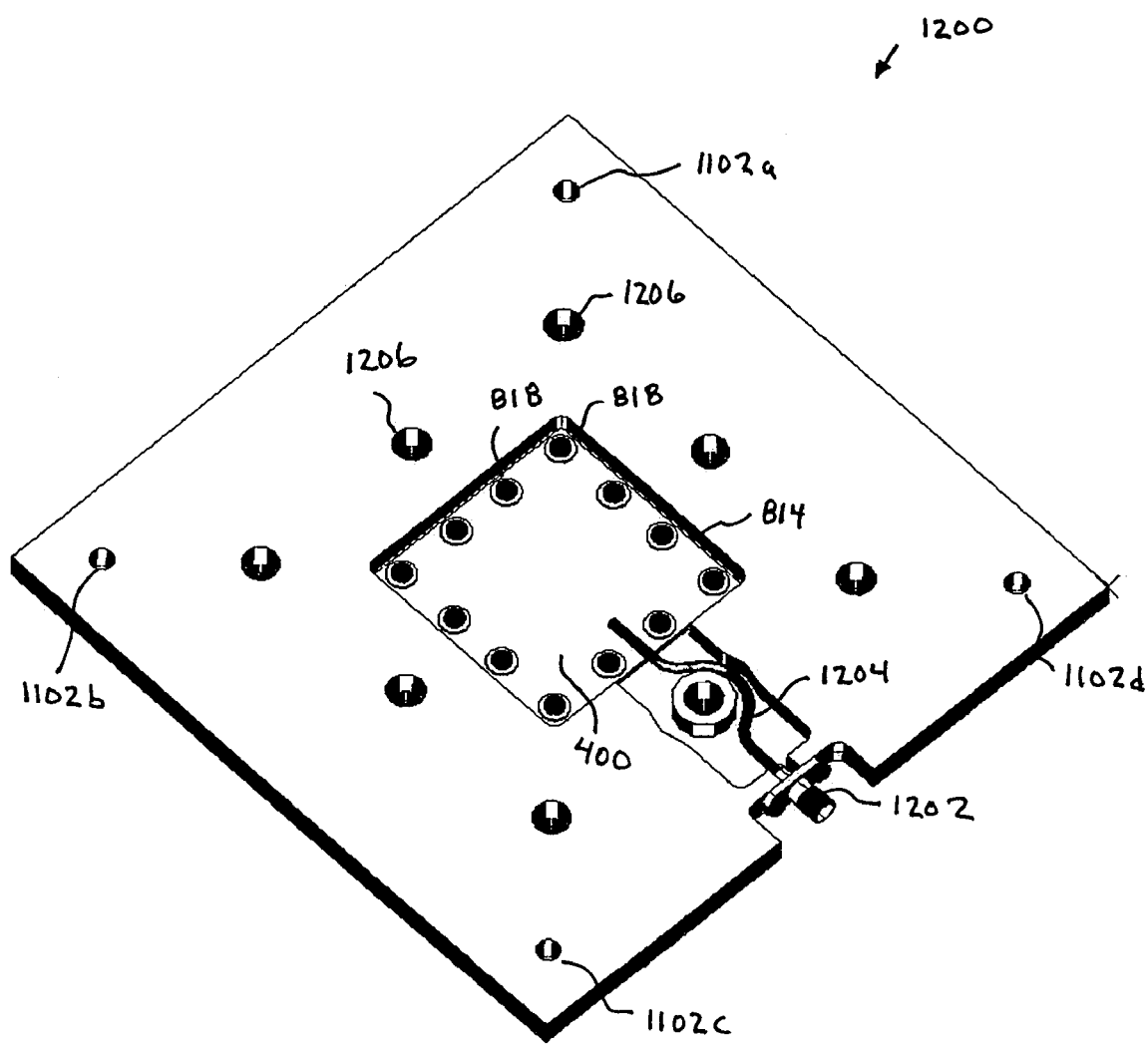
Figure 13:
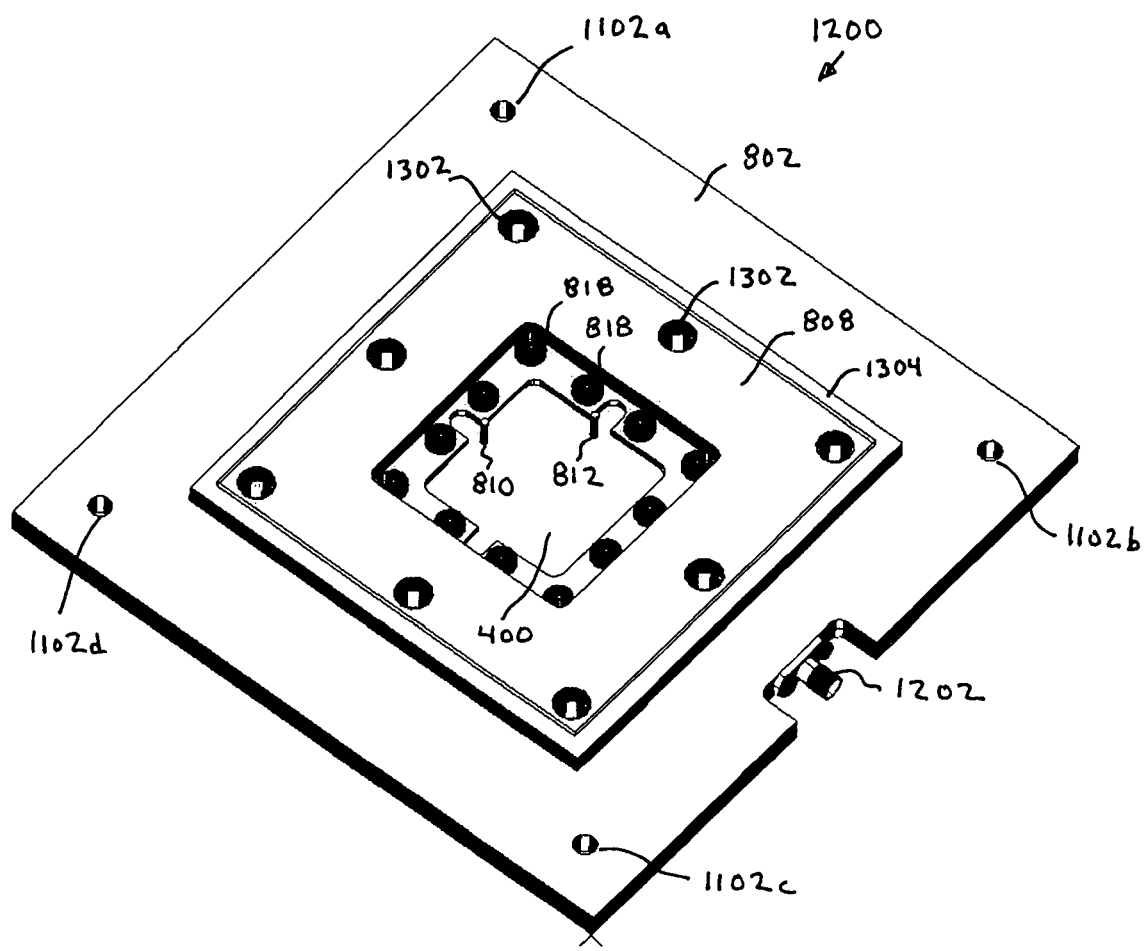
Figure 14:
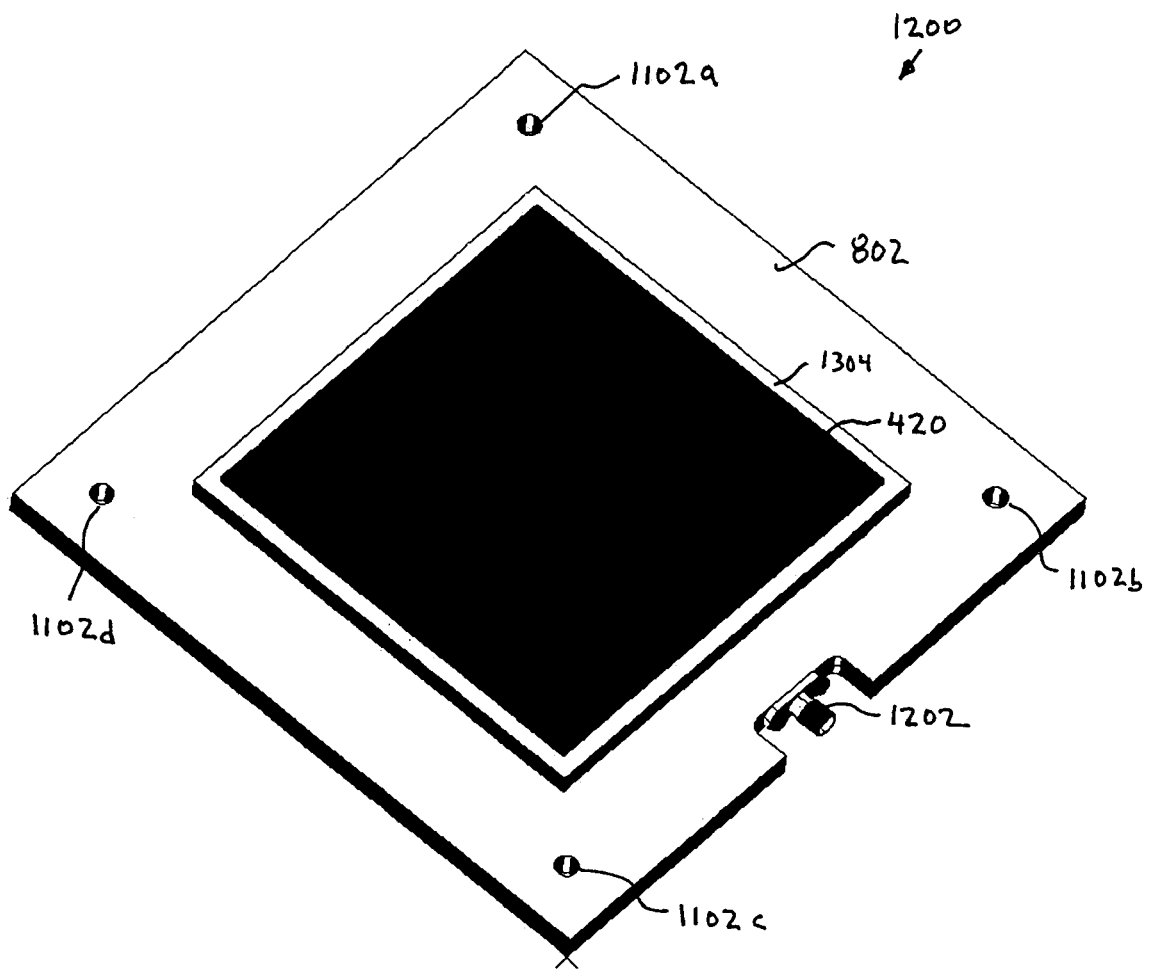

FIGS. 12-14 show perspective views of an antenna assembly 1200, similar to antenna assembly 800 of FIGS. 8 and 11. FIG. 12 shows a perspective view of a bottom surface of antenna assembly 1200. As shown in FIG. 1200, antenna assembly 1200 includes opening 814 and openings 1102a-d in back plate 802. The bottom surface of circuit board 400 is shown in opening 814, fitting into a recessed area around the perimeter of opening 814. A connector 1202 (such as a coaxial connector) is present at an edge of antenna assembly 1200, which receives an input RF signal, such as from a reader. Connector 1202 is coupled to circuit board 400 by a coaxial cable 1204.

FIG. 13 shows a perspective view of a top surface of antenna assembly 1200 (with antenna 420 not shown). As shown in FIGS. 12 and 13, twelve screws 818 are used to mount circuit board 400 to the recessed perimeter area around opening 814. First and second compressible contact member 810 and 812 are shown extending from circuit board 400. Furthermore, FIG. 13 shows compressible electrically insulating material 808 formed on back plate 802 around circuit board 400. FIG. 13 also shows a planar frame 1304 attached to and covering a perimeter region of a top surface of insulating material 808. Planar frame 1304 is configured to fit around the perimeter edges of antenna 420, when antenna 420 is attached to insulating material 808. Planar frame 1304 is described in further detail below.

FIG. 14 shows a perspective view of the top surface of antenna assembly 1200, with antenna 420 visible and attached to back plate 802, being supported by insulating material 808 (not visible in FIG. 14) on back plate 802. FIG. 14 further shows planar frame 1304 positioned to surround antenna 420 on insulating material 808.

FIGS. 12 shows eight openings 1206 through back plate 802, and FIG. 13 shows eight corresponding openings 1302 through insulating material 808, for receiving screws (or other tuning elements). In one example, the screws are 5/16-16 thread by 3/8 long hex head set screws, and back plate 802 is a 1/4 inch thick aluminum plate.

The screws that are received in openings 1206 enable fine-tuning of antenna 420. In other words, these screws may be adjusted, to provide for tuning of parameters of antenna 420. For example, the tuning allows high isolation to be established between first point 412 (e.g., the horizontal antenna feed point) and second point 414 (e.g., the vertical antenna feed point) of antenna 420, and insures that each polarization has a matched impedance versus frequency characteristic.

As is indicated by the positions of openings 1206 shown in FIGS. 12 and 13, screws inserted in openings 1206 affect a capacitance between back plate 802 (which is the local RF ground) and antenna 420, due to their proximity to antenna 420, at each screw position. By fine tuning the screws in the eight openings 1206 (e.g., turning each screw further in or out of their respective threaded opening 1206, to change the spacing of the screw tips from antenna 420), several parameters can be tuned, including:

A. A center frequency of antenna 420 for the horizontal and vertical polarizations. For example, a desired center frequency can be fine tuned by tuning the screws in openings 1206.

B. A tracking of an impedance between the horizontal and vertical polarizations. For example, by tuning the screws in openings 1206, the impedances can be more closely matched.

C. An amount of isolation between the horizontal and vertical polarization input points (e.g., at first and second compressible contact members 810 and 812). For example, the screws can be tuned to find a best isolation.

D. The antenna axial ratio (AR), which relates to a quality of the Circular Polarization (CP). For example, the screws can be tuned to find a best antenna axial ratio.

In an example tuning scenario, an RF network analyzer device is used by an operator (or computer controlled) to monitor parameters of antenna 420 while the operator adjusts the screws in openings 1206. For example, the operator can adjust the 8 screws until the return loss becomes −30 dB (i.e., a VSWR of 1.07:1).

Typical antennas prior to the antenna of the present invention would display a return loss of about −10 dB (i.e., a VSWR of 2:1) to about −14 dB (i.e., a VSWR of 1.5:1). A return loss of −10 dB means that an antenna reflection from a 1 Watt reader transmitter (e.g., a +30 dBm signal) would be +20 dBm. Such a high return loss would saturate most reader receivers.

A return loss of −30 dBm, enabled by the present antenna, is a return loss improvement of 20 dB over typical antennas, and provides a 100:1 reflected power ratio improvement. This means that the above described antenna reflection from the +30 dBm (1 Watt) reader transmitter will be 0.0 dBm, and thus the reader receiver is not likely to be saturated.

It is noted that the tuning of these screws is not required in all implementations. In an alternative embodiment, the antenna parameters may be within acceptable ranges without tuning due to suitable tolerances for the relevant components of the antenna system.

In an example embodiment, for very low return loss (such as −30 dB) across a frequency band of interest, the antenna can be configured to attain/balance parameters as follows:

1. Quadrature hybrid coupler 314 can be configured to provide an amplitude balance of approximately ±0.15 dB across the frequency band of interest.

2. Quadrature hybrid coupler 314 can be configured to provide a phase balance of approximately 90±2 degrees across the frequency band of interest.

3. Quadrature hybrid coupler 314 can be configured to provide a directivity of about 25 dB.

4. The two antenna loads (at the horizontal and vertical polarization input points, points 412 and 414) are balanced to present substantially identical vector impedances (as observed on a Smith Chart) across the frequency band of interest.

5. The antenna loads are isolated by approximately 25 dB.

6. The radiated axial ratio is configured to be low enough that a perpendicular RF-reflecting surface external to antenna 420 that receives a clockwise polarized wave (that had sufficient axial ratio fidelity) from antenna 420 reflects a reversed (i.e., counter-clockwise wave, with the same axial ratio fidelity), that is absorbed by termination element 324 at fourth port 322 of quadrature hybrid coupler 314, and thus does not appear as a return loss to the reader receiver. This assures that tags can still be read, even if antenna 420 is located in front of a large RF-reflective object. This clockwise to counterclockwise (or vice versa) rejection function of the present balanced implementation is dependent on the quality of the configured axial ratio.

As described above, planar frame 1304 is shown in FIGS. 13 and 14, and is configured to surround antenna 420 on insulating material 808. Planar frame 1304 is attached to an adhesive material on insulating material 808. In an example embodiment, planar frame 1304 is 0.003 inches thick, rectangular (e.g., square) shaped, and made from plastic. Furthermore, the edges of planar frame 1304 can have various widths, depending on the particular application. For example, an edge of planar frame 1304 may have a width of 0.15 inches. However, in alternative embodiments, planar frame 1304 can have other sizes and/or shapes, and can be made from other materials.

In an embodiment, insulating material 808 may supplied (e.g., by a manufacturer) having an adhesive material on the top and bottom surfaces of insulating material 808. The adhesive material can be selected from a variety of adhesive materials, including a 9485 acrylic adhesive. Planar frame 1304 can be placed on the upper surface of insulating material 808, to attach to the adhesive material. Peal-away paper sheets may be placed on the upper and lower surfaces of insulating material 808 to cover the remainder of the adhesive material (e.g., within planar frame 1304). When an antenna assembly is assembled, such as antenna assembly 1200, the paper sheets may be pealed away from insulating material 808, and insulating material 808 may be placed on back plate 802, to be attached to back plate 802 by the adhesive material. Antenna 420 may be placed on insulating material 808 within planar frame 1304, to be attached to insulating material 808 by the adhesive material. An alignment fixture may be used to align insulating material 808 when placed on back plate 808, and/or to align antenna 420 when placed on insulating material 808.

Planar frame 1304 provides numerous benefits, including:

(a) Covering the adhesive material around antenna 420 on the top surface of insulating material 808.

(b) Providing environmental protection (e.g., from sharp objects) for the top surface of insulating material 808 outside the perimeter of antenna 420.

(c) Providing for easier assembly for antenna assembly 1200. For example, it may be easier to apply planar frame 1304 to insulating material 808 than to mask-off the perimeter portion of the top surface of insulating material 808 during application of the adhesive material, or to attempt to remove excess adhesive material from the perimeter area of the top surface of insulating material 808.

Figure 15:
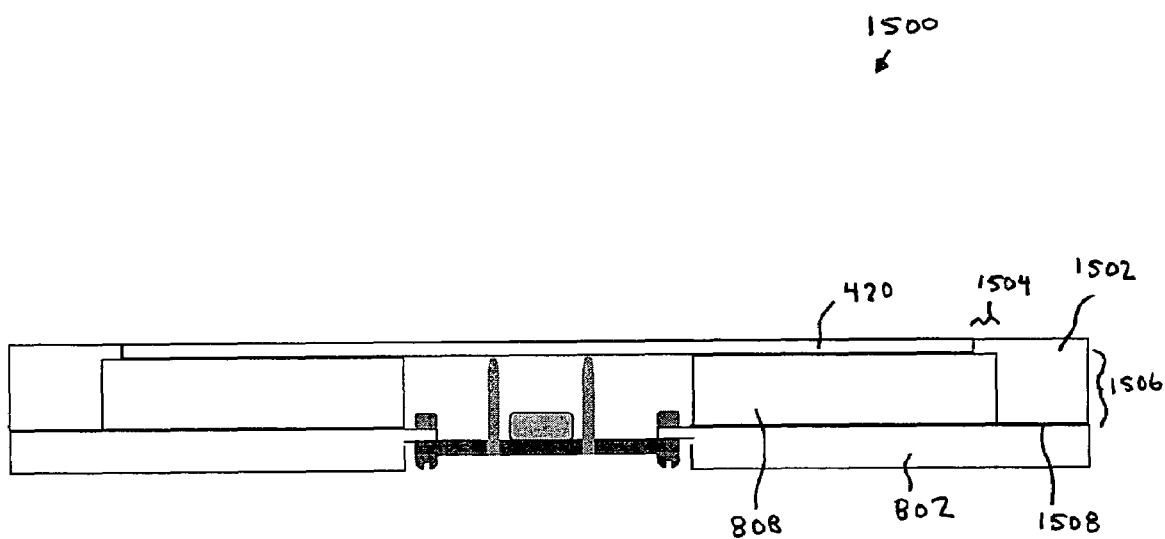
FIG. 15 shows an antenna assembly similar to the antenna assembly of FIG. 8, having a frame.

Planar frame 1304 can have other shapes, including non-planar configurations. For example, FIG. 15 shows an antenna assembly 1500 similar to antenna assembly 800, having a frame 1502. Similarly to planar frame 1304 shown in FIG. 13, frame 1502 surrounds antenna 420. Furthermore frame 1502 has a top inner edge 1504 that is attached to insulating material 808 by an adhesive material. Inner edge 1504 extends inward towards a center of frame 1502 from a side wall portion 1506 of frame 1502. Side wall portion 1506 extends downward to cover the outer sides of insulating material 808. A bottom edge 1508 of side wall portion 1506 contacts the top surface of back plate 802 around insulating material 808. Thus, frame 1502 covers a portion of insulating material 808 that was not covered by antenna 420 or back plate 802, and thus provides increased environmental protection for insulating material 808.

Due to the presence of frame 1502 adding protection to insulating material 808, antenna assembly 1500 can be used in rugged environments. For example, antenna assembly 1500 can be used in a box crusher, such as being positioned in a hole formed in a wall of the box crusher. In such an implementation, frame 1502 can be made from a durable material, such as Delrin.

Example Implementations of Antennas Systems

Antenna systems of the present invention can be mounted anywhere that is convenient for interrogating RFID tags. For example, an antenna system can be mounted in a commercial environment, such as in a warehouse, a business, or store, and in a military or other non-commercial environment. Furthermore, an antenna system may be attached to a stationary structure or to a mobile structure. The antenna system may be used with fork lifts, warehouse box crushers, and with conveyor belts. The small size possible and the durability of the present antenna system enable the antenna system to be deployed in many previously inaccessible locations.

Figure 16A:
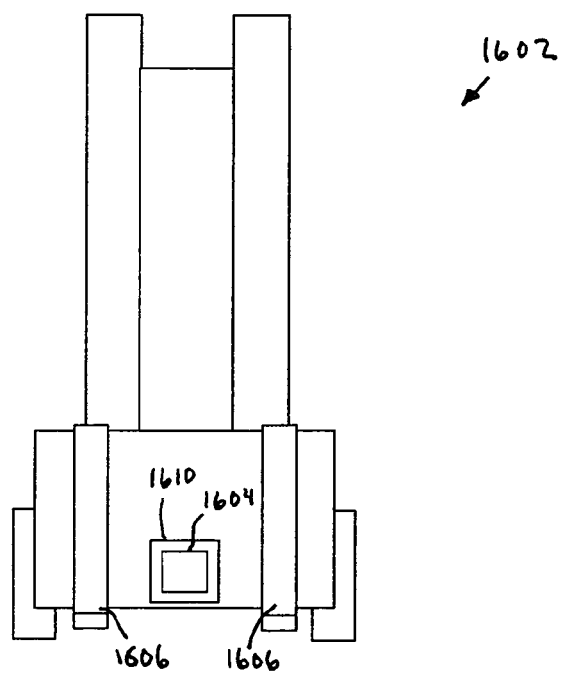
FIGS. 16A and 16B show views of a forklift that mounts an antenna assembly, according to an example embodiment of the present invention.
Figure 16B:
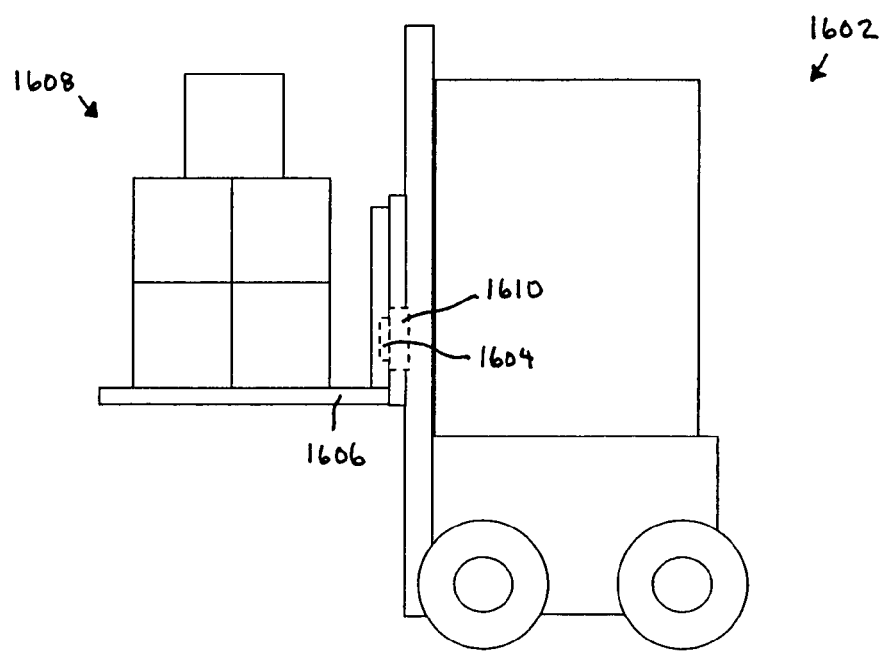

For example, FIGS. 16A and 16B show views of a forklift 1602 that mounts an antenna assembly 1604, according to an example embodiment of the present invention. Antenna assembly 1604 can be any of antenna assemblies 800, 900, 1000, and 1200 described above, for example. FIG. 16A shows a front view of forklift 1602, with forks 1606 of forklift 1602 at a near bottom position. FIG. 16B shows a side view of forklift 1602, with forks 1606 raised to a middle position (with respect to FIG. 16A) and supporting a load of objects 1608. As shown in FIGS. 16A and 16B, antenna assembly 1604 can be mounted in an unprotected location between forks 1606 of forklift 1602 (e.g., in the "load back rest" area), to be advantageously close to objects 1608, for reading of tags associated with objects 1608. Antenna assembly 1604 may take impacts in this location, but can survive the impacts due to its rugged construction, including shock absorption due to compressible electrically insulating material 808. A wireless, battery operated reader 1610 coupled to antenna assembly 1604, that uses antenna assembly 1604 to radiate interrogation signals, and to receive tag responses, can be mounted directly behind antenna assembly 1604 in forklift 1602 as shown in FIGS. 16A and 16B, or can be mounted elsewhere on forklift 1602. Thus, in an embodiment, reader 1610 may include a battery and/or may include a wireless communications module for communicating with a remote computer system. For example, the wireless communications module may be configured to communicate according to WLAN (e.g., 802.11) and/or BLUETOOTH (e.g., 802.15) standards. The wireless communications module may communicate with an access point located elsewhere on forklift 1602 or located external to forklift 1602.

Alternately, reader 1610 can be mounted remotely from forklift 1602, and thus may not necessarily be wireless and/or battery operated. For example, reader 1610 may be coupled to antenna assembly 1604 by a cable.

The combination of the "balanced amplifier"-type approach to circuit 302 (shown in FIG. 3), and the rugged antenna structure construction (e.g., as shown in FIGS. 8, 9, 10, and 12) allows antennas to have excellent return loss despite an very low profile. The combination of a low profile and ruggedness allows the antenna to be applied to locations that were previously not possible, such as the unprotected load back rest (LBR) area between forks 1606 of forklift 1602. This location is very desirable for reading an RFID tag that is mounted on a pallet (not shown in FIGS. 16A and 16B) lifted by forklift 1602 that supports objects 1608. The proper reading of a pallet tag, as well as tags of objects 1608 allow a RFID-associated host computer system to properly associate all the items, confirming that a proper "stacking order" was fulfilled. The associated load may then be transported to a shipping truck, or temporarily stored on a shelf within a warehouse. An antenna mounted between forks 1606 allows a reader to read a tag mounted to the forward edge of the warehouse shelf while the load is being placed on the shelf by forklift 1602. This allows the host computer system to confirm that the load was placed on the proper shelf.

Any number of antennas may be mounted to a particular structure, such as forklift 1602 or a conveyor belt system, to increase tag reading performance. For example, four antenna assemblies 1604 may be mounted on forklift 1602, including antenna assemblies mounted both high and low on the front of forklift 1602, and a pair of antenna assemblies mounted on forklift 1602 to be side-looking readers. In a warehouse environment, the antenna assemblies may be exposed to hydraulic oil, petroleum, chemicals, temperature extremes, direct sunlight, and the physical abuse of impacts from the load being transported, as well as the impacts with shelves, walls, and doors. The rugged structure of the antenna systems described herein are configured to withstand this abuse.

RFID reader antennas described herein overcome the disadvantages of prior antennas. For example, reader antennas described herein have a dramatically lower reflection coefficient (with or without reflecting objects being placed near the antenna). Furthermore, reader antennas described herein are sufficiently rugged such that a protective radome is not required. The antenna assembly itself is more rugged than available radomes.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) device, comprising:
　　a quadrature hybrid coupler having first, second, third, and fourth ports, wherein the first port receives an input radio frequency (RF) signal, the second port outputs a first RF output signal, and the third port outputs a second RF output signal, wherein the second RF output signal is shifted in phase by 90 degrees relative to the first RF output signal; a a termination element coupled to the fourth port;

a circuit board, wherein the termination element and quadrature hybrid coupler are mounted to the circuit board;

a back plate having a centrally-located opening, wherein the circuit board is mounted in the centrally-located opening; and a patch antenna having a first point coupled to the first RF output signal and a second point coupled to the second RF output signal, wherein the patch antenna radiates a circularly polarized RF signal, wherein the patch antenna is planar and is positioned parallel to the circuit board.

2. The device of claim 1, wherein the input RF signal and the first and second RF output signals are routed on the circuit board as printed circuit transmission lines.

3. The device of claim 2, wherein the printed circuit transmission lines are coplanar waveguide type transmission lines.

4. The device of claim 1, wherein the first output RF signal is coupled to the first point of the patch antenna by a first compressible contact member mounted between the circuit board and the first point of the patch antenna; and wherein the second output RF signal is coupled to the second point of the patch antenna by a second compressible contact member mounted between the circuit board and the second point of the patch antenna.

5. The device of claim 4, wherein the first and second compressible contact members are pogo pins.

6. The device of claim 4, wherein the first and second compressible contact members are conductive elastomer contacts.

7. The device of claim 1, further comprising:

a compressible electrically insulating material that supports the patch antenna on the back plate.

8. The device of claim 7, wherein the compressible electrically insulating material is a silicone rubber dielectric material.

9. The device of claim 8, wherein the silicone rubber dielectric material is a high durometer silicone rubber.

10. The device of claim 7, wherein the compressible electrically insulating material provides for shock absorption during an impact on the patch antenna.

11. The device of claim 7, wherein the compressible electrically insulating material has a second centrally located opening to form an open space between the circuit board and patch antenna.

12. The device of claim 7, wherein the compressible electrically insulating material covers a surface of the circuit board to substantially fill a space between the circuit board and patch antenna.

13. The device of claim 1, wherein a perimeter edge of the circuit board is attached to a perimeter edge of the centrally-located opening by an adhesive.

14. The device of claim 1, wherein the circuit board is mounted in the centrally-located opening by a plurality of attachment elements.

15. The device of claim 1, wherein the back plate is coupled to ground.

16. The device of claim 1, wherein a signal reflected from the first point of the patch antenna enters the second port of the quadrature hybrid coupler and is split into first and second reflection signals, wherein the second reflection signal is shifted in phase by 90 degrees relative to the first reflection signal;

wherein a signal reflected from the second point of the patch antenna enters the third port of the quadrature hybrid coupler and is split into third and fourth reflection signals by the quadrature hybrid coupler, wherein the fourth reflection signal is shifted in phase by 90 degrees relative to the third reflection signal;

wherein the first and third reflection signals cancel each other at the first port of the quadrature hybrid coupler; and wherein the second and fourth reflection signals are received by the termination element coupled to the fourth port of the quadrature hybrid coupler.

17. The device of claim 1, wherein the termination element is a resistor.

18. The device of claim 1, wherein the quadrature hybrid coupler is a directional quadrature hybrid coupler.

19. A radio frequency identification (RFID) device, comprising:

a back plate;

a circuit board supported by the back plate, wherein the circuit board receives an input radio frequency (RF) signal and outputs a first RF output signal and a second RF output signal;

a patch antenna;

a compressible electrically insulating material that mounts the patch antenna on the back plate;

a first compressible contact member that couples the first output RF signal to a first point of the patch antenna; and a second compressible contact member that couples the second output RF signal to a second point of the patch antenna.

20. The device of claim 19, wherein the back plate has a centrally-located opening, wherein the circuit board is mounted in the centrally-located opening.

21. The device of claim 20, wherein a perimeter edge of the circuit board is attached to a perimeter edge of the centrally-located opening by an adhesive.

22. The device of claim 20, wherein the circuit board is mounted in the centrally-located opening by a plurality of attachment elements.

23. The device of claim 19, wherein the compressible electrically insulating material is a silicone dielectric material.

24. The device of claim 23, wherein the silicone dielectric material is a high durometer silicone rubber.

25. The device of claim 19, wherein the compressible electrically insulating material provides for shock absorption during an impact on the patch antenna.

26. The device of claim 19, wherein the compressible electrically insulating material has a centrally located opening to form an open space between the circuit board and patch antenna.

27. The device of claim 19, wherein the compressible electrically insulating material covers a surface of the circuit board to substantially fill a space between the circuit board and patch antenna.

28. The device of claim 19, wherein the back plate is coupled to ground.

29. The device of claim 19, further comprising:

a quadrature hybrid coupler mounted to the circuit board, and having first, second, third, and fourth ports, wherein the first port receives the input radio frequency (RF) signal, the second port outputs the first RF output signal, and the third port outputs the second RF output signal, wherein the second RF output signal is shifted in phase by 90 degrees relative to the first RF output signal; and a termination element mounted to the circuit board and coupled to the fourth port.

30. The device of claim 29, wherein the patch antenna radiates a circularly polarized RF signal.

31. The device of claim 19, further comprising:
a plurality of tuning screws positioned in openings through the back plate having tips positioned adjacent to the patch antenna.

32. The device of claim 31, wherein the tuning screws can be adjusted to tune at least one parameter of the patch antenna.

33. The device of claim 19, wherein the quadrature hybrid coupler is a directional quadrature hybrid coupler.

34. The device of claim 19, further comprising:
a RFID reader that generates the input RF signal.

35. The device of claim 34, wherein the RFJD reader comprises a battery and a wireless communications module.

36. The device of claim 35, wherein the device is mounted to a forklift.

37. The device of claim 36, wherein the device is mounted to the forklift between forks of the forklift.

38. The device of claim 19, further comprising:
a frame attached to the compressible electrically insulating material, wherein the frame surrounds a perimeter edge of the patch antenna.

* * * * *

UNITED STATES PATENT AND TRADEMARK OFFICE
CERTIFICATE OF CORRECTION

PATENT NO. : 7,551,140 B2  
APPLICATION NO. : 11/265143  
DATED : June 23, 2009  
INVENTOR(S) : Knadle, Jr. et al.

Page 1 of 1

It is certified that error appears in the above-identified patent and that said Letters Patent is hereby corrected as shown below:

IN THE CLAIMS

1. In Column 21, Line 3, after "signal;" delete "a".

2. In Column 24, Line 1, in Claim 35, delete "RFJD" and insert -- RFID --, therefor.

Signed and Sealed this  
Fourth Day of October, 2011

David J. Kappos  
*Director of the United States Patent and Trademark Office*